United States Patent
Ito et al.

(10) Patent No.: US 12,063,498 B2
(45) Date of Patent: Aug. 13, 2024

(54) KEY DERIVATION METHOD, COMMUNICATION SYSTEM, COMMUNICATION TERMINAL, AND COMMUNICATION DEVICE

(71) Applicant: NEC Corporation, Tokyo (JP)

(72) Inventors: Hironori Ito, Tokyo (JP); Anand Raghawa Prasad, Tokyo (JP); Naoaki Suzuki, Tokyo (JP); Andreas Kunz, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/916,853

(22) Filed: Jun. 30, 2020

(65) Prior Publication Data

US 2020/0329372 A1 Oct. 15, 2020

Related U.S. Application Data

(63) Continuation of application No. 16/095,572, filed as application No. PCT/JP2017/015590 on Apr. 18, 2017, now abandoned.

(30) Foreign Application Priority Data

Apr. 27, 2016 (JP) ................. 2016-089050

(51) Int. Cl.
*H04W 12/033* (2021.01)
*H04L 9/08* (2006.01)
(Continued)

(52) U.S. Cl.
CPC ............. *H04W 12/033* (2021.01); *H04L 9/08* (2013.01); *H04L 9/0861* (2013.01); *H04L 9/14* (2013.01);
(Continued)

(58) Field of Classification Search
CPC ............. H04W 12/0401; H04W 12/10; H04W 12/04031; H04W 12/04033; H04L 9/14;
(Continued)

(56) References Cited

U.S. PATENT DOCUMENTS

2014/0281550 A1 9/2014 Resch
2016/0157084 A1 6/2016 Tsubouchi
(Continued)

FOREIGN PATENT DOCUMENTS

WO 2014/052750 A2 4/2014
WO WO-2016/162502 A1 10/2016
(Continued)

OTHER PUBLICATIONS

3GPP 3rd Generation Partnership Project; Technical Specification Group Services and System Aspects; Architecture Enhancements for Dedicated Core Networks; Stage 2 (Release 13), 3GPP TR 23.707 V13.0.0 (Dec. 2014), pp. 1-39.
(Continued)

*Primary Examiner* — Mazda Sabouri
(74) *Attorney, Agent, or Firm* — Sughrue Mion, PLLC

(57) ABSTRACT

An object is to provide a key generation method capable of maintaining a high security level in each of sliced networks when network slicing is applied to a core network. A key generation method according to this disclosure specifies network slice identification information indicating a network slice system that provides a service to be used by a communication terminal (50) among a plurality of network slice systems included in a core network (10) and, using the network slice identification information, generates a service key to be used for security processing in the network slice system indicated by the network slice identification information.

4 Claims, 23 Drawing Sheets

(51) Int. Cl.
| | |
|---|---|
| *H04L 9/14* | (2006.01) |
| *H04L 9/40* | (2022.01) |
| *H04M 3/42* | (2006.01) |
| *H04W 12/037* | (2021.01) |
| *H04W 12/041* | (2021.01) |
| *H04W 12/043* | (2021.01) |
| *H04W 12/0431* | (2021.01) |
| *H04W 12/0433* | (2021.01) |
| *H04W 12/106* | (2021.01) |
| *H04W 84/00* | (2009.01) |

(52) U.S. Cl.
CPC .............. *H04L 63/06* (2013.01); *H04M 3/42* (2013.01); *H04W 12/037* (2021.01); *H04W 12/041* (2021.01); *H04W 12/043* (2021.01); *H04W 12/0431* (2021.01); *H04W 12/0433* (2021.01); *H04W 12/106* (2021.01); *H04W 84/00* (2013.01); *H04L 2209/80* (2013.01); *H04L 2463/061* (2013.01)

(58) Field of Classification Search
CPC ... H04L 9/0861; H04L 63/06; H04L 2209/80; H04L 2463/061
See application file for complete search history.

(56) References Cited

U.S. PATENT DOCUMENTS

| | | |
|---|---|---|
| 2017/0111339 A1 | 4/2017 | Lee et al. |
| 2017/0123907 A1 | 5/2017 | Dhuse et al. |
| 2018/0048465 A1 | 2/2018 | Schliwa-Bertling et al. |
| 2018/0063135 A1 | 3/2018 | Hahn et al. |
| 2018/0206152 A1* | 7/2018 | Zhang ................... H04W 76/10 |
| 2019/0191309 A1* | 6/2019 | Kweon .................... H04L 9/32 |

FOREIGN PATENT DOCUMENTS

| | | |
|---|---|---|
| WO | WO-2017/005208 A1 | 1/2017 |
| WO | WO-2017/121482 A1 | 7/2017 |

OTHER PUBLICATIONS

Samsung "Correction on the existing solution for re-routing", SA WG2 Temporary Document, 3GPP TSG SA WG2 Meeting #105, TD S2-143132, Oct. 13-17, 2014, Sapporo, Japan, pp. 1-3.

3GPP 3rd Generation Partnership Project; Technical Specification Group Services and System Aspects; Study on Architecture for Next Generation System (Release 14), 3GPP TR 23.799 V0.3.0 (Mar. 2016), pp. 1-52.

3GPP "3rd Generation Partnership Project; Technical Specification Group Services and System Aspects; 3GPP System Architecture Evolution (SAE); Security architecture (Release 12)" 3GPP TS 33.401 V12.14.0 (Mar. 2015), pp. 1-131.

3GPP TR 23.799 V0.2.0 (Feb. 2016) Study on Architecture for Next Generation System (Release 14—Annex B, 5.1 Key issue 1: Support of network slicing (pp. 1-17).

3GPP TS 33.401 V13.2.0 (Mar. 2016)—3GPP System Architecture Evolution (SAE); Security architecture (Release 13) 6.2 EPS Key hierarchy (pp. 1-146).

Extended European Search Report issued in European Patent Application No. 17789349,2, dated Apr. 10, 2019, 10 pages.

Interdigital, Distribution of NFs across Network Slices, SA WG2 Meeting #114 S2-161807, Apr. 5, 2016 (pp. 1-6).

International Search Report corresponding to PCT/JP2017/015590 mailed Jul. 11, 2017 ((2 pages).

NEC, Solution: shared and dedicated network functions for network slicing, SA WG2 Meeting #114 S2-161785, Apr. 5, 2016 (pp. 1-3).

Qualcomm Incorporated, Huawei, Solution X for Key Issue 12 on Authentication Framework, SA WG2 Meeting #114 S2-162256, Apr. 22, 2016 (pp. 1-4).

Qualcomm Incorporated, Solution X for Key Issue 12 on Authentication Framework, SA WG2 Meeting #114 S2-161497, Apr. 6, 2016 (pp. 1-4).

Japanese Office Action for JP Application No. 2018-514517 mailed on Apr. 13, 2021 with English Translation.

\* cited by examiner

KEY DERIVATION METHOD, COMMUNICATION SYSTEM, COMMUNICATION TERMINAL, AND COMMUNICATION DEVICE

CROSS-REFERENCE TO RELATED APPLICATIONS

This application is a continuation of U.S. patent application Ser. No. 16/095,572, entitled "Key Derivation Method, Communication System, Communication Terminal, and Communication Device," filed on Oct. 22, 2018, which is a national stage application of International Application No. PCT/JP2017/015590 entitled "Key Derivation Method, Communication System, Communication Terminal, and Communication Device" filed on Apr. 18, 2017, which claims priority to Japanese Patent Application No. 2016-089050 filed on Apr. 27, 2016, the disclosures of each of which are hereby incorporated by reference in their entirety.

TECHNICAL FIELD

The present disclosure relates to a key derivation method, a communication system, a communication terminal and a communication device and, particularly, to a key derivation method, a communication system, a communication terminal and a communication device used when network slicing is applied to a core network.

BACKGROUND ART

Studies have been conducted regarding IoT (Internet of Things) services recently. For IoT services, a large number of terminals that autonomously perform communication without need of a user operation (which are referred to hereinafter as IoT terminals) are used. Thus, in order for a service operator to provide IoT services using a large number of IoT terminals, it is desirable to accommodate a large number of IoT terminals in a network managed by a telecommunications carrier or the like.

The configuration of a core network to which network slicing is applied is disclosed in Annex B of Non Patent Literature 1. The network slicing is a technique that divides a core network into several slices, each slice supporting a service to be provided, in order to efficiently accommodate a large number of IoT terminals. Further, it is disclosed in Section 5.1 of Non Patent Literature 1 that customization and optimization are required for each sliced network (network slice system).

On the other hand, the structure of a key to be used in EPS security processing is disclosed in Section 6.2 of Non Patent Literature 2. To be specific, USIM (Universal Subscriber Identity Module) and AuC (Authentication Center) have a master key K. Using the master key K, the USIM and the AuC generate CK (Confidentiality Key) and IK (Integrity Key).

Next, a UE (User Equipment) and an HSS (Home Subscriber Server) generates a key Kasme by using CK, IK and SNID (Serving Network Identity). SNID is ID that identifies a telecommunications carrier. Then, the UE and an MME (Mobility Management Entity) generate a key to be used for security processing of a core network and a radio access network.

In EPS, security processing such as message encryption and message anti-tampering (message integrity assurance) is performed using keys generated in this manner.

CITATION LIST

Non Patent Literature

NPL1: GPP TR23.799 V0.2.0 (2016-2) Annex B, 5.1 Key issue 1: Support of network slicing
NPL2: 3GPP TS 33.401 V13.2.0 (2016-03) 6.2 EPS key hierarchy

SUMMARY OF INVENTION

Technical Problem

However, the following problem occurs when the key structure disclosed in Non Patent Literature 2 is applied to a core network to which the network slicing disclosed in Non Patent Literature 1 is applied. In the core network to which the network slicing is applied, each network is operated independently of each other, and a high security level is required. However, the key structure disclosed in Non Patent Literature 2 indicates that a UE uses a single key Kasme in a core network. Accordingly, the same key Kasme is used in each of networks divided from the core network. As a result, each of the sliced networks uses the same key as the other networks, which causes a decrease in security level.

An object of the present disclosure is to provide a key derivation method, a communication system, a communication terminal and a communication device capable of establishing or maintaining a high security level when network slicing is applied to a core network.

Solution to Problem

A key derivation method according to a first aspect of the present disclosure is a key derivation method in a core network including a plurality of network slices, wherein the method derives a key for each of the plurality of network slices.

A communication system according to a second aspect of the present disclosure includes a core network including a plurality of network slices and a communication device, wherein the communication device derives a key for each of the plurality of network slices.

A communication terminal according to a third aspect of the present disclosure includes a communication means for communicating with a plurality of network slices included in a core network through a wireless network, and a key derivation means for deriving a key for each of the plurality of network slices.

A communication device according to a fourth aspect of the present disclosure includes a key derivation means for deriving a key for each of a plurality of network slices included in a core network.

Advantageous Effects of Invention

According to the present disclosure, it is possible to provide a key derivation method, a communication system, a communication terminal and a communication device capable of establishing or maintaining a high security level when network slicing is applied to a core network.

DESCRIPTION OF EMBODIMENTS

First Embodiment

Embodiments of the present disclosure are described hereinafter with reference to the drawings. A configuration example of a communication system according to a first embodiment of the present disclosure is described with reference to FIG. 1. The communication system in FIG. 1 includes a core network 10, a RAN (Radio Access Network) 40, and a communication terminal 50. The core network 10 may be a network standardized by, for example, 3GPP (3rd Generation Partnership Project). Further, the core network 10 includes a communication device 20, an NS (Network Slice) system A, and an NS system B. The NS system A and the NS system B are networks divided by applying network slicing to the core network 10. In the following description, the NS system A is denoted by NS #A, and the NS system B is denoted by NS #B in some cases.

The communication device 20 includes an NS key generator 201 for NS system. Note that the communication device 20 may be a computer device that operates when a processor executes a program stored in a memory. The processor may be, for example, a microprocessor, an MPU (Micro Processing Unit) or a CPU (Central Processing Unit). The memory may be a volatile memory, a nonvolatile memory, or a combination of a volatile memory and a nonvolatile memory. The processor executes one or a plurality of programs including a group of instructions for causing a computer to perform algorithms described with reference to the following drawings. The communication device 20 may be, for example, an HSS (Home Subscriber Server), an HLR (Home Location Register), an AuC (Authentication Center) or the like standardized by 3GPP. The HSS and the HLR are node devices that mange subscriber information concerning the communication terminal 50. The AuC is a node device that stores data concerning security processing of the communication terminal 50.

Figure 1:
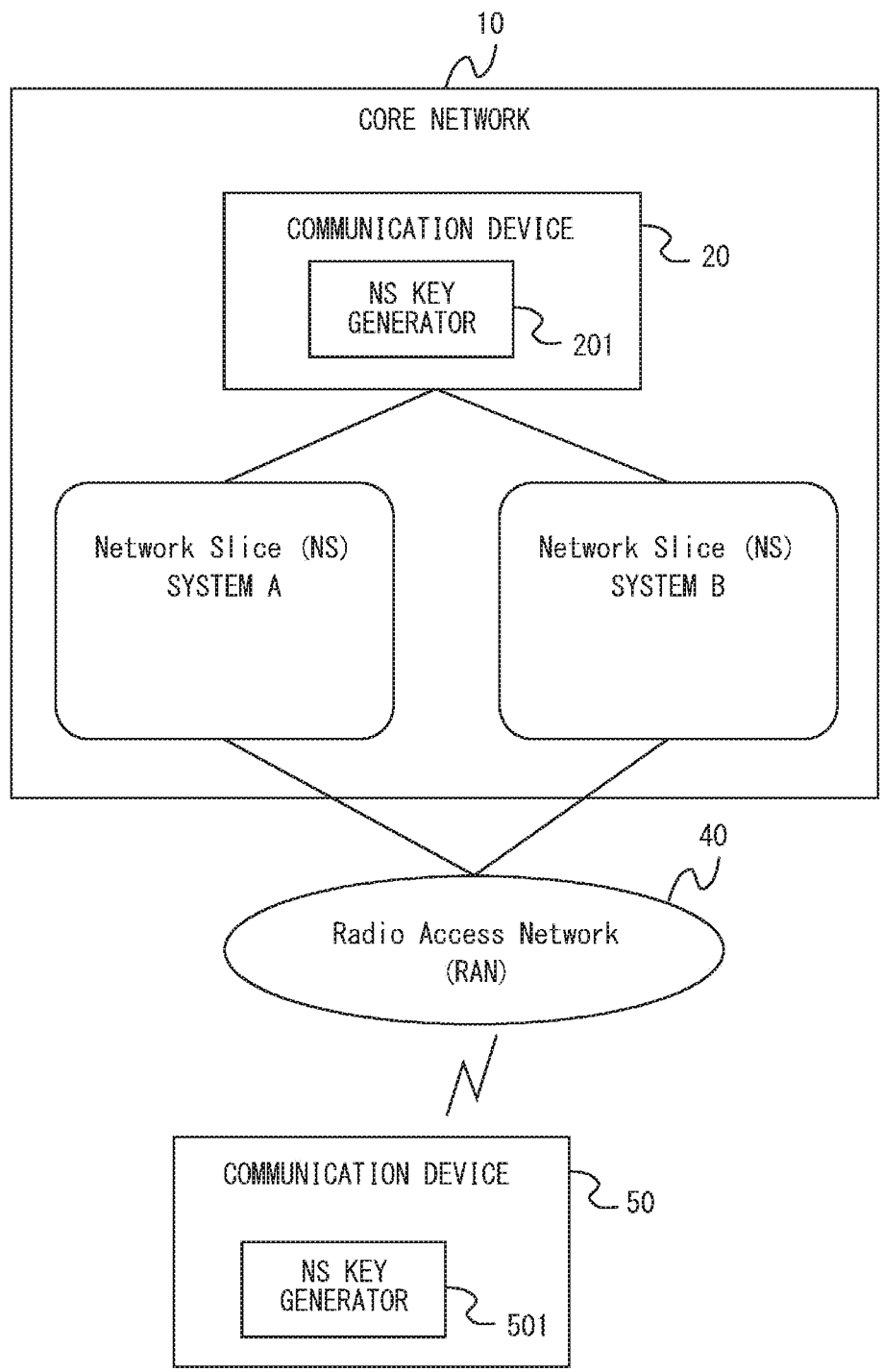
FIG. 1 is a configuration diagram of a communication system according to a first embodiment.

The NS system is a communication system composed of a plurality of node devices. For example, the NS system A is a communication system constructed to provide a service different from the service provided by the NS system B. Although FIG. 1 shows the configuration where the core network 10 includes the NS system A and the NS system B, the core network 10 may include three or more NS systems.

The NS system A includes, for example, a security device, a gateway device or the like. The security device is a device that performs encryption of data transmitted and received by the communication terminal 50, integrity assurance (anti-tampering) of data transmitted and received by the communication terminal 50, authentication of the communication terminal 50 or the like. The gateway device is a device that relays or transmits user plane data (or U-plane data) or control plane data (or C-plane data).

Further, the NS system A may include a device that manages subscriber information of communication terminals using the NS system A or the like. The NS system B may have the same configuration as that of the NS system A. Alternatively, the NS system B may include a device necessary for providing a unique service and have a different configuration from that of the NS system A.

The RAN 40 is a network that provides a radio channel to the communication terminal 50. The RAN 40 may include a base station, and may further include a base station control device that controls a base station or the like.

The communication terminal 50 includes an NS key generator 501 for the NS system. Note that the communication terminal 50 may be a computer device that operates when a processor executes a program stored in a memory. The processor may be, for example, a microprocessor, an MPU (Micro Processing Unit) or a CPU (Central Processing Unit). The memory may be a volatile memory, a nonvolatile memory, or a combination of a volatile memory and a nonvolatile memory. The processor executes one or a plurality of programs including a group of instructions for causing a computer to perform algorithms described with reference to the following drawings. The communication terminal 50 may be, for example, a cellular phone terminal, a smart phone terminal, a tablet terminal or the like. Further, the communication terminal 50 may be an IoT terminal. The IoT terminal is a terminal that autonomously performs communication without the need for a user operation. The IoT terminal may be referred to as an M2M (Machine to Machine) terminal, an MTC (Machine Type Communication) or the like.

The flow of a key generation process performed in the NS key generator 201 of the communication device and the NS key generator 501 of the communication terminal is described hereinafter with reference to FIG. 2. The key is used for security processing concerning the communication terminal 50. For example, the key may be used for data encryption, decryption or the like. Further, the key generation process shown in FIG. 2 may be performed in a security device included in the NS system.

First, the communication device 20 and the communication terminal 50 (which are hereinafter referred to as devices that perform the key generation process) specify NS identification information indicating either the NS system A or the NS system B included in the core network 10 that provides a service to be used by the communication terminal 50 (S11). The NS identification information may be called NSID (Network Slice Identity). The devices that perform the key generation process may select NS identification information indicating an NS system that provides a service to be used by the communication terminal 50 from among a plurality of NS identification information stored in the device. Alternatively, the devices that perform the key generation process may receive NS identification information indicating an NS system that provides a service to be used by the communication terminal 50 from a device that manages NS identification information. Alternatively, the devices that perform the key generation process may receive NS identification information from a device in an NS system that provides a service to be used by the communication terminal 50.

Next, by using the NS identification information, the devices that perform the key generation process generate, in the NS key generator, a service key to be used for security processing of the NS system indicated by the NS identification information (S12). The service key is generated using the NS identification information. Therefore, the service key differs from NS system to NS system. To be specific, the NS key generator generates Service A Key from NS #A ID, and generates Service B Key from NS #B ID.

Figure 2:
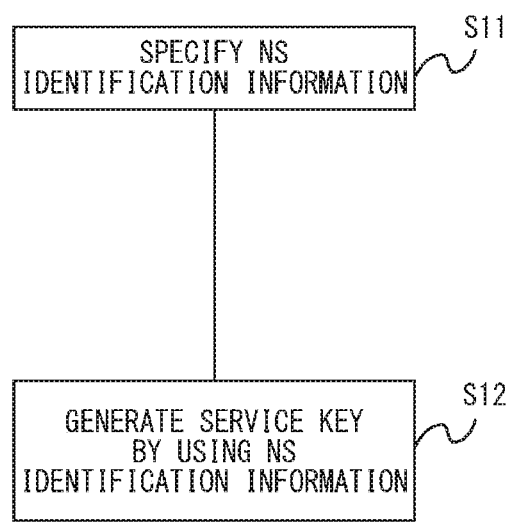
FIG. 2 is a view showing a flow of a key generation process according to the first embodiment.

As described above, the service key which differs for each NS system is generated as a result of performing the key generation process in FIG. 2. A device that performs security processing generates, from the service key, a key to be used for encryption processing, a key to be used for integrity assurance processing and the like. Specifically, each NS system can generate a key to be used for encryption processing (ex. Encryption key, Cipher key), a key to be used for confidentiality processing (ex. Confidentiality key), a key to be used for integrity assurance processing and the like that satisfy the requirements of each NS system by using the service key which differs for each NS system.

By performing the key generation process in FIG. 2, it is possible to prevent the use of a key common to all the NS systems. As a result, it is possible to enhance the independence of security processing in each NS system. Further, NS systems using service keys which differ from each other can maintain a higher security level than that of NS systems using a common ke to a plurality of NS systems.

Second Embodiment

A configuration example of a communication system according to a second embodiment of the present disclosure is described with reference to FIG. 3. In the communication system shown in FIG. 3, the same elements as in FIG. 1 are denoted by the same reference symbols as in FIG. 1.

Figure 3:
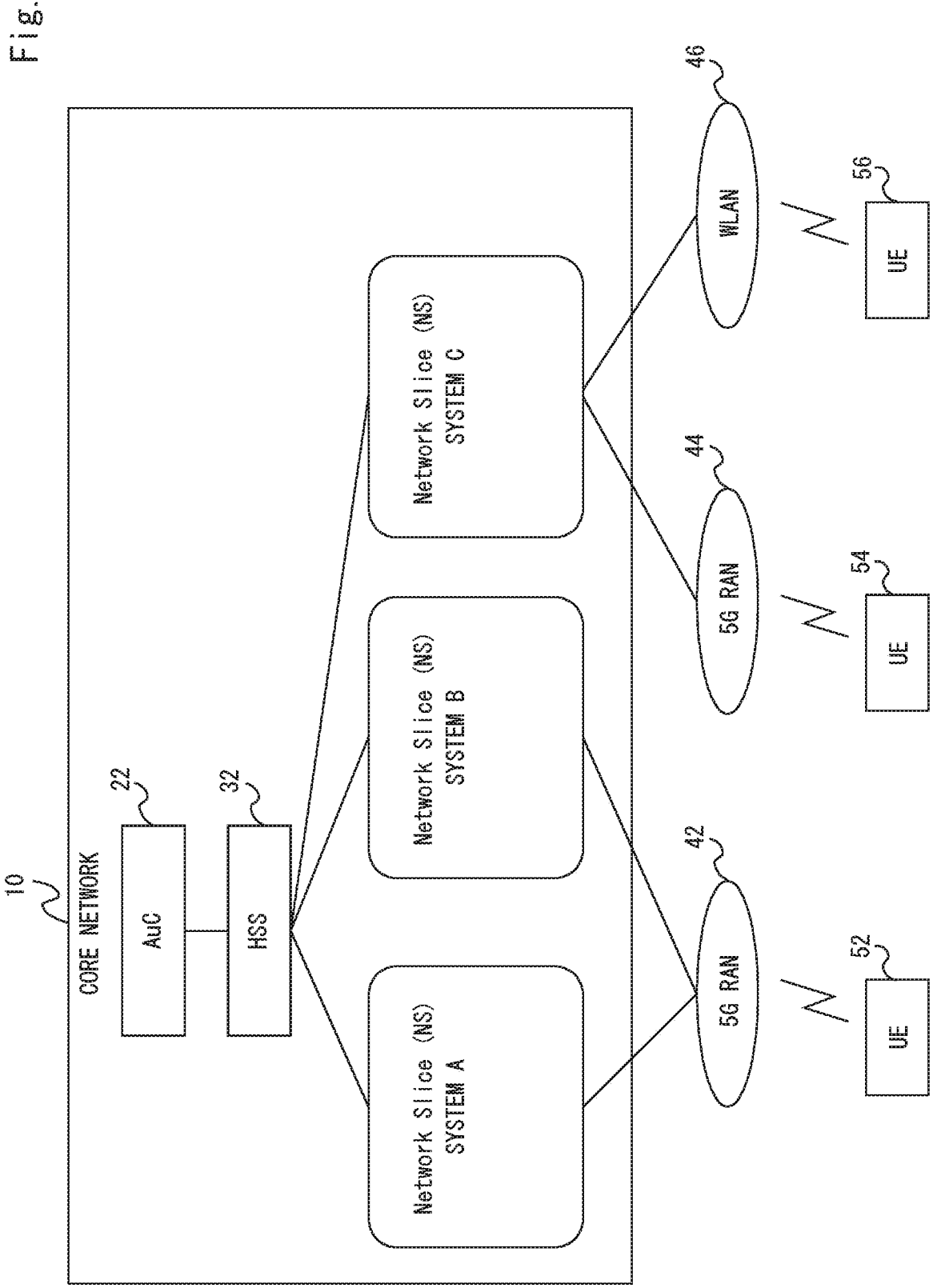
FIG. 3 is a configuration diagram of a communication system according to a second embodiment.

The communication system in FIG. 3 includes a core network 10, a 5G RAN 42, a 5G RAN 44, a WLAN (Wireless Local Area Network) 46, a UE (User Equipment) 52, a UE 54, and a UE 56. The 5G RAN 42 and the 5G RAN 44 are next-generation RANs that achieve a low-delay wide-band radio frequency or the like, for example. Although RAN to be used in the next-generation is called 5G RAN in this example, the name of RAN to be used in the next-generation is not limited to 5G RAN.

The WLAN 46 is RAN that uses wireless LAN communication as a wireless communication system. The wireless LAN communication may be a communication system defined by IEEE (The institute of Electrical and Electronics Engineers), for example. A network using a different communication sys wireless tem from 5G RAN and WLAN may be used as RAN.

The UE is used as a generic name for communication terminals (user terminals) in 3GPP.

A configuration example of the core network 10 is described hereinafter. The core network 10 includes an AuC 22, an HSS 32, an NS system A, an NS system B, and an NS system C. The AuC 22 and the HSS 32 correspond to the communication device 20 in FIG. 1. The HSS 32 manages subscriber information of the UE 52, the UE 54, the UE 56 and the like.

The NS system A and the NS system B use the 5G RAN 42 as RAN. Thus, the NS system A and the NS system B communicate with the UE 52 through the 5G RAN 42. The NS system C uses the 5G RAN 44 and the WLAN 46 as RAN. The NS system C communicates with the UE 54 through the 5G RAN 44. Further, the NS system C communicates with the UE 56 through the WLAN 46.

The AuC 22 manages parameters related to security processing of the UE 52, the UE 54 and the UE 56 (which are referred to hereinafter as the UE 52 etc.). The parameters related to security processing may be parameters to be used for integrity assurance processing, confidentiality processing, and encryption processing of NAS (Non Access Stratum), for example. The NAS is a layer used for communication between the UE 52 etc. and the core network 10. Alternatively, the parameters related to security processing may be parameters to be used for integrity assurance processing, confidentiality processing, and encryption processing of AS (Access Stratum), for example. The AS is a layer used for communication between the 5G RAN 42, the 5G RAN 44 and the UE 52 etc.

Alternatively, the parameters related to security processing may be parameters that define the length of a key. The length of a key is indicated by the number of bits, for example. Alternatively, the parameters related to security processing may be parameters indicating an encryption algorithm, a key generation algorithm, an authentication algorithm or the like.

Figure 4:
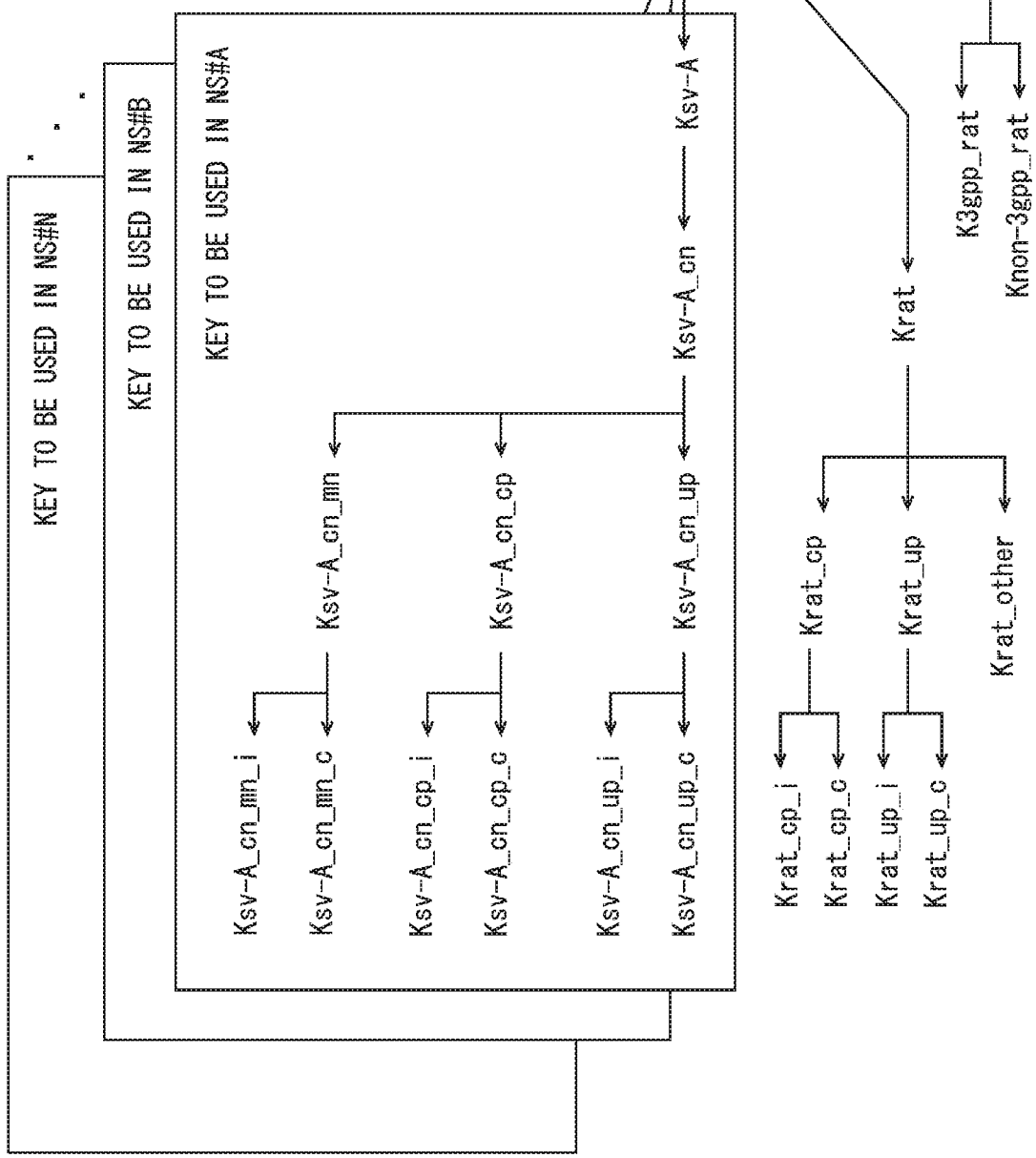
FIG. 4 is a view showing a key structure according to the second embodiment.

The structures of keys to be used in each NS system are described hereinafter with reference to FIG. 4. Each US has the same key structure as the NS system to use. Thus, FIG. 4 shows the structures of keys to be used in the UE and the NS system. Note that, in this figure, ng indicates Next Generation, sv indicates Service, rat indicates Radio Access Technology, cn indicates Core Network, cp indicates C-Plane, up indicates U-Plane, mn indicates Management, i indicates Integrity, and c indicates Confidentiality.

Figure 5:
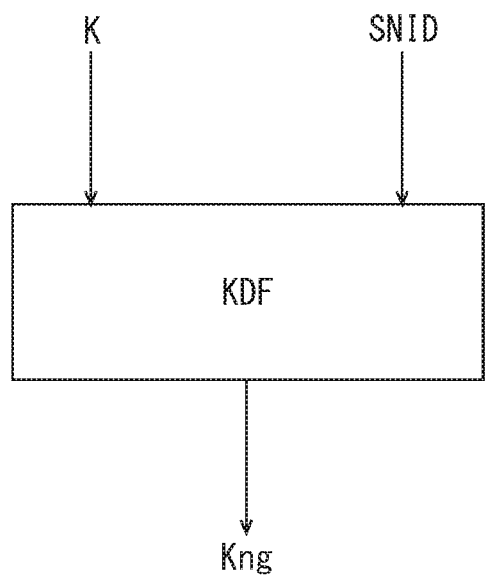
FIG. 5 is a view showing a derivation method of a secondary key Kng according to the second embodiment.

The UE 52 and the AuC 22 have a master key K. A secondary key Kng (K next generation) is derived from the master key K. A method of deriving the secondary key Kng is described hereinafter with reference to FIG. 5. KDF (Key Derivation Function) is used for the derivation of Kng. As KDF, a derivation function such as HMAC-SHA-256 is used, for example. FIG. 5 shows that the secondary key Kng is output as a result that the master key K and SNID (Serving Network Identity) are input to KDF. SNID may be ID indicating a carrier that manages the core network 10, for example. The derivation of the secondary key Kng on the core network 10 side may be carried out in any of the AuC 22 and the HSS 32.

Referring back to FIG. 4, a service key Ksv-A is derived from the secondary key Kng. The service key Ksv-A is a key to be used for security processing in the NS system A. Further, a service key Ksv-B to be used in the NS system B and a service key Ksv-C to be used in the NS system C are also derived from the secondary key Kng. In FIG. 4, the structure of the key to be used in the NS system A is mainly described.

Figure 6:
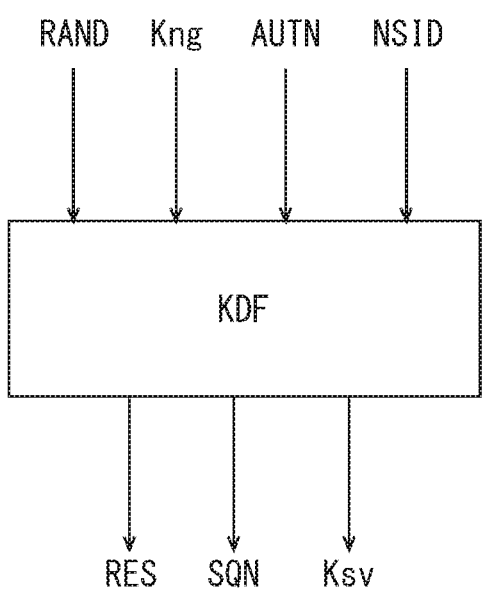
FIG. 6 is a view showing a derivation method of a service key Ksv in a UE according to the second embodiment.

A method of deriving the service key Ksv is described hereinafter with reference to FIGS. 6 and 7. FIG. 6 shows a method of deriving the service key Ksv in the UE. FIG. 6 shows that RES (Response), SQN (Sequence Number), and the service key Ksv are output as a result that the secondary key Kng, NSID, RAND (Random number) and AUTN (Authentication Token) are input to KDF.

Figure 7:
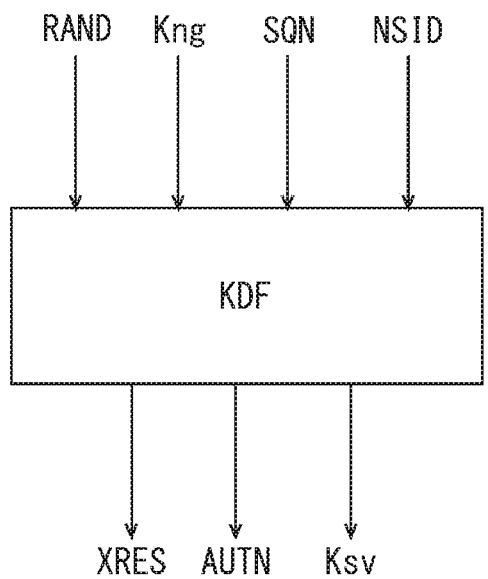
FIG. 7 is a view showing a derivation method of a service key Ksv in an AuC according to the second embodiment.

FIG. 7 shows a method of deriving the service key Ksv in the AuC 22. FIG. 7 shows that XRES (Expected Response), AUTN and the service key Ksv are output as a result that the secondary key Kng, NSID, RAND and SQN are input to KDF. The derivation of the service key Ksv on the core network 10 side may be carried out in any of the AuC 22 and the HSS 32.

FIGS. 6 and 7 show that the service key Ksv is derived by AKA (Authentication and Key Agreement) procedure. The UE is authenticated when RES that is output when the service key Ksv is generated in the UE and XRES that is output when the service key Ksv is generated in the AuC 22 match. Further, when RES and XRES match, it is verified that the service key Ksv generated in the UE and the service key Ksv generated in the AuC 22 match.

Figure 8:
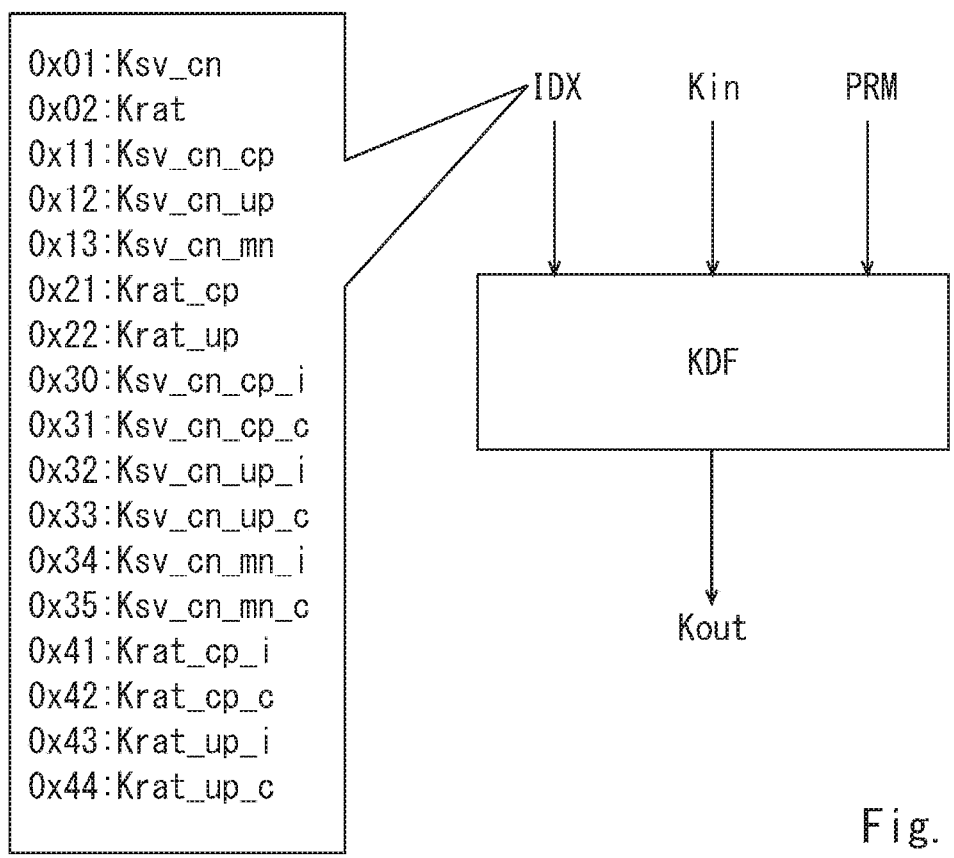
FIG. 8 is a view showing a derivation method of a service key Ksv-A_cn and subsequent keys according to the second embodiment.

Referring back to FIG. 4, a service key Ksv-A_cn is derived from the service key Ksv-A. The service key Ksv-A_cn is a key to be used for security processing of the NS system A. A method of deriving the service key Ksv-A_cn and subsequent keys is described hereinafter with reference to FIG. 8. Note that the description in the frame indicates the correspondence between IDX and Kout. FIG. 8 shows that a key Kout is output as a result that a key Kin, IDX and PRM are input to KDF. PRM is a given parameter. IDX is an index number. Kin indicates a key to be input, and Kout indicates a key to be output.

For example, when 0x01 is input as IDX and the service key Ksv-A is input as Kin, Ksv-A_cn is output as Kout. Thus, the output key Kout is determined according to a value input as IDX and a key input as Kin.

Referring back to FIG. 4, a service key Ksv-A_cn_mn, a service key Ksv-A_cn_cp, and a service key Ksv-A_cn_up are derived from the service key Ksv-A_cn. The service key Ksv-A_cn_up is a key to be used for security processing of user plane data. The service key Ksv-A_cn_cp is a key to be used for security processing of control plane data. The service key Ksv-A_cn_mn is a key to be used mainly for management data other than user plane data and control plane data.

A service key Ksv-A_cn_up_c and a service key Ksv-A_cn_up_i are derived from the service key Ksv-A_cn_up. The service key Ksv-A_cn_up_c is a key to be used for encryption processing of user plane data. The service key Ksv-A_cn_up_i is a key to be used for integrity assurance processing of user plane data.

A service key Ksv-A_cn_cp_c and a service key Ksv-A_cn_cp_i are derived from the service key service key Ksv-A_cn_cp. The service key Ksv-A_cn_cp_c is a key to be used for encryption processing of control plane data. The service key Ksv-A_cn_cp_i is a key to be used for integrity assurance processing of control plane data.

A service key Ksv-A_cn_mn_c and a service key Ksv-A_cn_mn_i are derived from the service key Ksv-A_cn_mn. The service key Ksv-A_cn_mn_c is a key to be used mainly for encryption processing of management data other than user plane data and control plane data. The service key Ksv-A_cn_mn_i is a key to be used mainly for integrity assurance processing of management data other than user plane data and control plane data.

A radio key Krat is derived from the secondary key Kng. The radio key Krat is derived by using the key derivation method shown in FIG. 8. The radio key Krat is used for security processing of the 5G RAN 42. For example, the radio key Krat may be output as Kout as a result that radio identification information that identifies the 5G RAN 42 is input as PRM.

A radio key Krat_cp, a radio key Krat_up and a radio key Krat_other are derived from the radio key Krat. The radio key Krat_cp is used for security processing of control plane data in the 5G RAN 42. The radio key Krat_up is used for security processing of user plane data in the 5G RAN 42. The radio key Krat_other is used for security processing of data other than control plane data and user plane data in the 5G RAN 42.

A radio key Krat_up_c and a radio key Krat_up_i are derived from the radio key Krat_up. The radio key Krat_up_c is a key to be used for encryption processing of user plane data. The radio key Krat_up_i is a key to be used for integrity assurance processing of user plane data.

A radio key Krat_cp_c and a radio key Krat_cp_i are derived from the radio key Krat_cp. The radio key Krat_cp_c is a key to be used for encryption processing of control plane data. The radio key Krat_cp_i is a key to be used for integrity assurance processing of control plane data.

A radio key K3gpp_rat and a radio key Knon–3gpp_rat are derived from the secondary key Kng. The radio key K3gpp_rat is a key to be used for security processing of RAN other than the 5G RAN 42, which is RAN defined by 3GPP. The radio key Knon–3gpp_rat is a key to be used for security processing of RAN other than RAN defined by 3GPP.

A configuration example of the AuC 22 is described hereinafter with reference to FIG. 9. The AuC 22 includes a master key controller 61, an NS key generator 62, and a communication unit 63. The components of the AuC 22, such as the master key controller 61, the NS key generator 62 and the communication unit 63, may be software or module whose processing is executed by running, on a processor, a program stored in a memory. Alternatively, the components of the AuC 22 may be hardware such as a circuit or a chip.

The master key controller 61 controls the master key K to be used for security processing related to the UE. The NS key generator 62 generates the secondary key Kng by using the master key K controlled by the master key controller 61. Further, the NS key generator 62 generates the service key Ksv-A to Ksv-N (which is referred to hereinafter as Ksv) for each NS system by using the secondary key Kng. The NS key generator 62 generates the service key Ksv by using NSID received from the HSS 32, for example.

The communication unit 63 may be a transmitter and receiver. The communication unit 63 outputs NSID received from the HSS 32 to the NS key generator 62. Further, the communication unit 63 transmits the service key Ksv generated by the NS key generator 62 to the HSS 32.

Further, the radio key Krat is generated in a security device in the NS system. Therefore, the communication unit 63 transmits the secondary key Kng to the HSS 32. The HSS 32 transmits the received secondary key Kng to the security device in the NS system.

Figure 9:
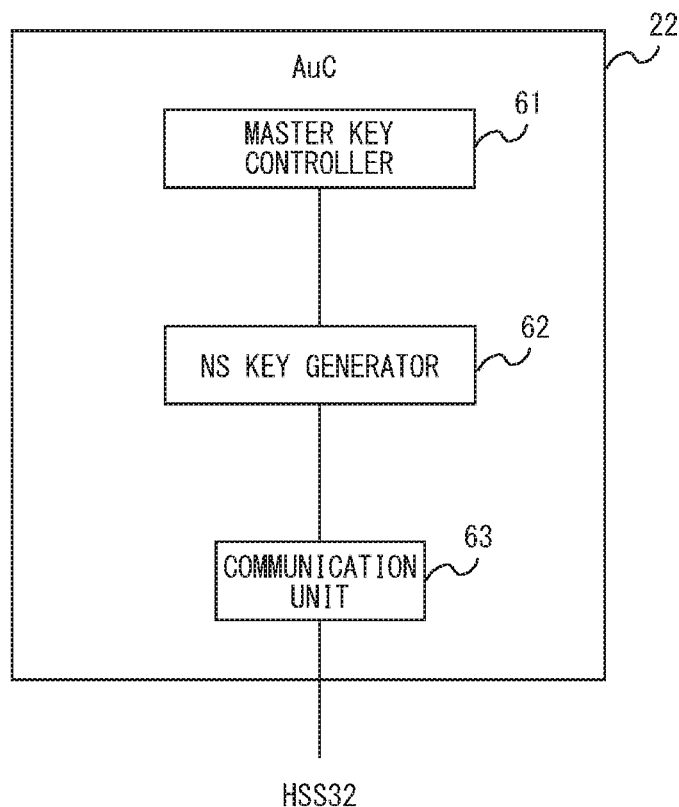
FIG. 9 is a configuration diagram of the AuC according to the second embodiment.

Although the configuration where the AuC 22 generates the secondary key Kng and the service key Ksv is described in FIG. 9, the HSS 32 may generate the service key Ksv. Further, the HSS 32 may generate the secondary key Kng and the service key Ksv. In the case where the HSS 32 generates the secondary key Kng and the service key Ksv, the communication unit 63 transmits the master key K to the HSS 32.

Figure 10:
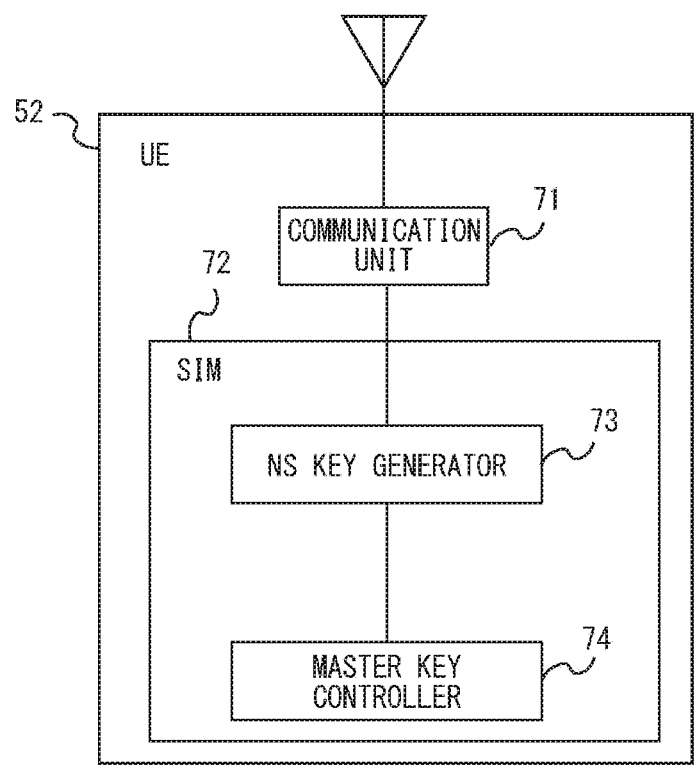
FIG. 10 is a configuration diagram of the UE according to the second embodiment.

A configuration example of the UE 52 is described hereinafter with reference to FIG. 10. The UE 54 and the UE 56 have the same configuration as the UE 52, and therefore detailed description thereof is omitted.

The UE 52 includes a communication unit 71 and a SIM (Subscriber Identity Module) 72. The communication unit 71 may be software or module whose processing is executed by running, on a processor, a program stored in a memory. Alternatively, the communication unit 71 may be hardware such as a circuit or a chip. The communication unit 71 may be a transmitter and receiver.

The SIM 72 may be stored in a card to be mounted on the UE 52, or may be stored in an internal memory of the UE 52. The SIM 72 includes an NS key generator 73 and a master key controller 74. The master key controller 74 controls the master key K to be used for security processing with the core network 10. The NS key generator 73 generates the secondary key Kng by using the master key K controlled by the master key controller 74. Further, the NS key generator 73 generates the service key Ksv which differs for each NS system to use. Further, the NS key generator 73 generates the keys subsequent to the service key Ksv shown in FIG. 4.

The communication unit 71 transmits, to the 5G RAN 42, data encrypted etc. by using the service key such as the service key Ksv-A_cn_up_c generated in the NS key generator 73.

The flow of an Attach process related to the UE 52 is described hereinafter with reference to FIG. 11. The UE 52 (SIM 72) means that the UE 52 includes the SIM 72. Further, the AuC 22/HSS 32 means that it is the AuC 22 or the HSS 32.

First, the UE 52 starts a connection process with the 5G RAN 42 (S21). For example, in order to communicate with a base station placed in the 5G RAN 42, the UE 52 connects to the base station through a wireless communication line.

Next, the UE 52 transmits an Attach request message to the NS system A through the 5G RAN 42 (S22). Then, the AKA process is performed among the UE 52, the NS system A and the AuC 22/HSS 32 (S23). As a result that the AKA process in Step S23 is carried out, it can be verified in the UE 52 and the AuC 22/HSS 32 that the service key Ksv-A generated in the UE 52 and the service key Ksv-A generated in the AuC 22/HSS 32 match. The AKA process in Step S23 is described in detail later.

The UE 52 then establishes a NAS security with the NS system A (S24). In Step S24, the UE 52 and the NS system A generates the service key Ksv-A_cn_up_c, the service key Ksv-A_cn_up_i, the service key Ksv-A_cn_cp_c, the service key Ksv-A_cn_cp_i, the service key Ksv-A_cn_mn_c, and the service key Ksv-A_cn_mn_i.

Then, the AuC 22/HSS 32 transmits the secondary key Kng to the NS system A (S25). A security device in the NS system A then generate the radio key Krat by using the secondary key Kng. The NS system A transmits the generated radio key Krat to the 5G RAN 42 (S26). It is assumed that the UE 52 also generates the radio key Krat after Step S24.

Then, the UE 52 establishes an AS security with the 5G RAN 42 (S27). In Step S27, the UE 52 and the 5G RAN 42 generate the radio key Krat_cp_i, the radio key Krat_cp_c, the radio key Krat_up_i, and the radio key Krat_up_c.

After that, the UE 52 repeats the processing of Steps S22 to S27 with the NS system B also (S28). Note that, although the UE 52 performs the Attach process with the two NS systems A and B through the 5G RAN 42 in this example, when the UE 52 can receive services from three or more NS systems through the 5G RAN 42, it repeats the Attach process with them.

Figure 11:
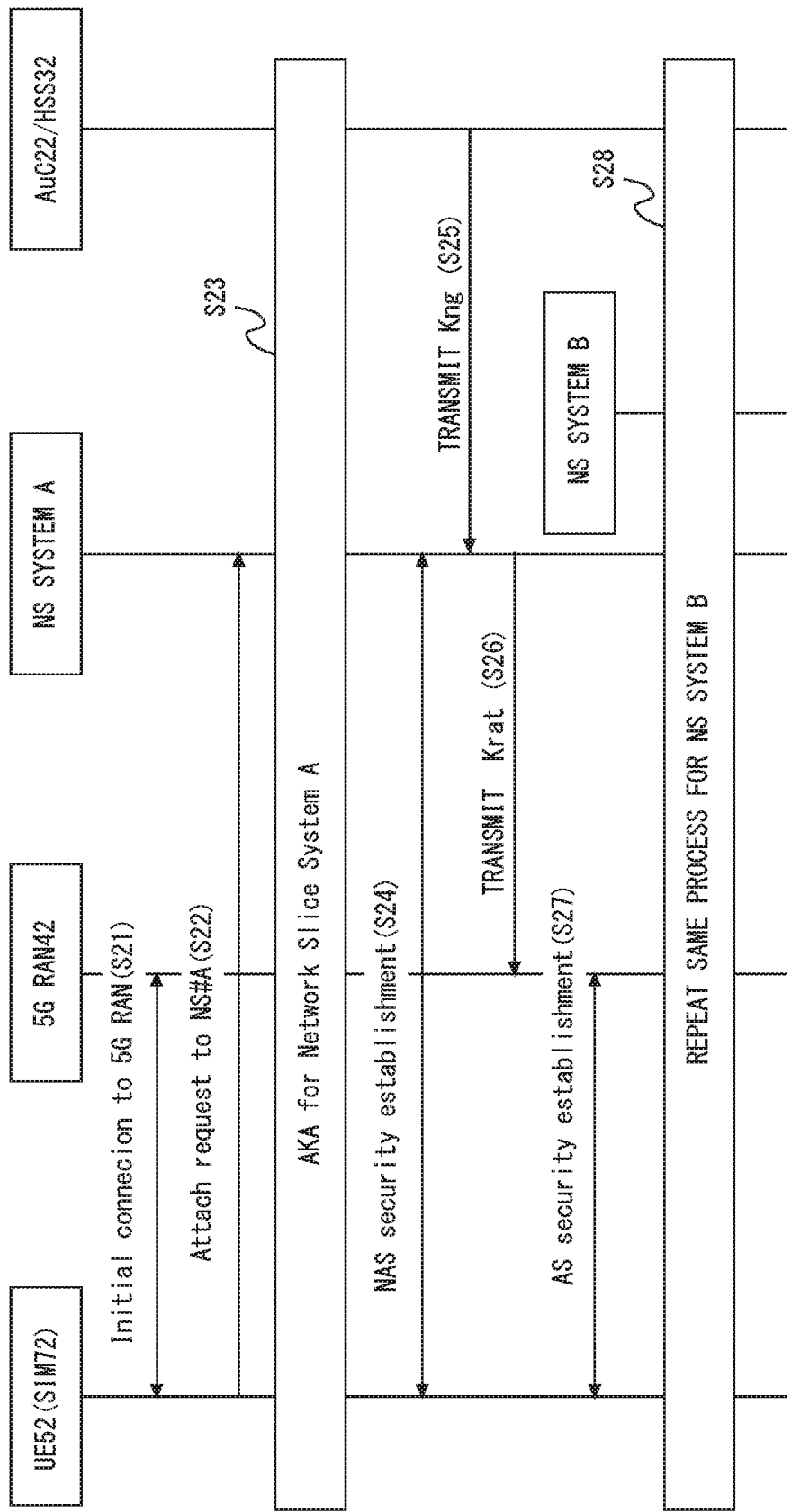
FIG. 11 is a view showing a flow of an Attach process according to the second embodiment.
Figure 12:
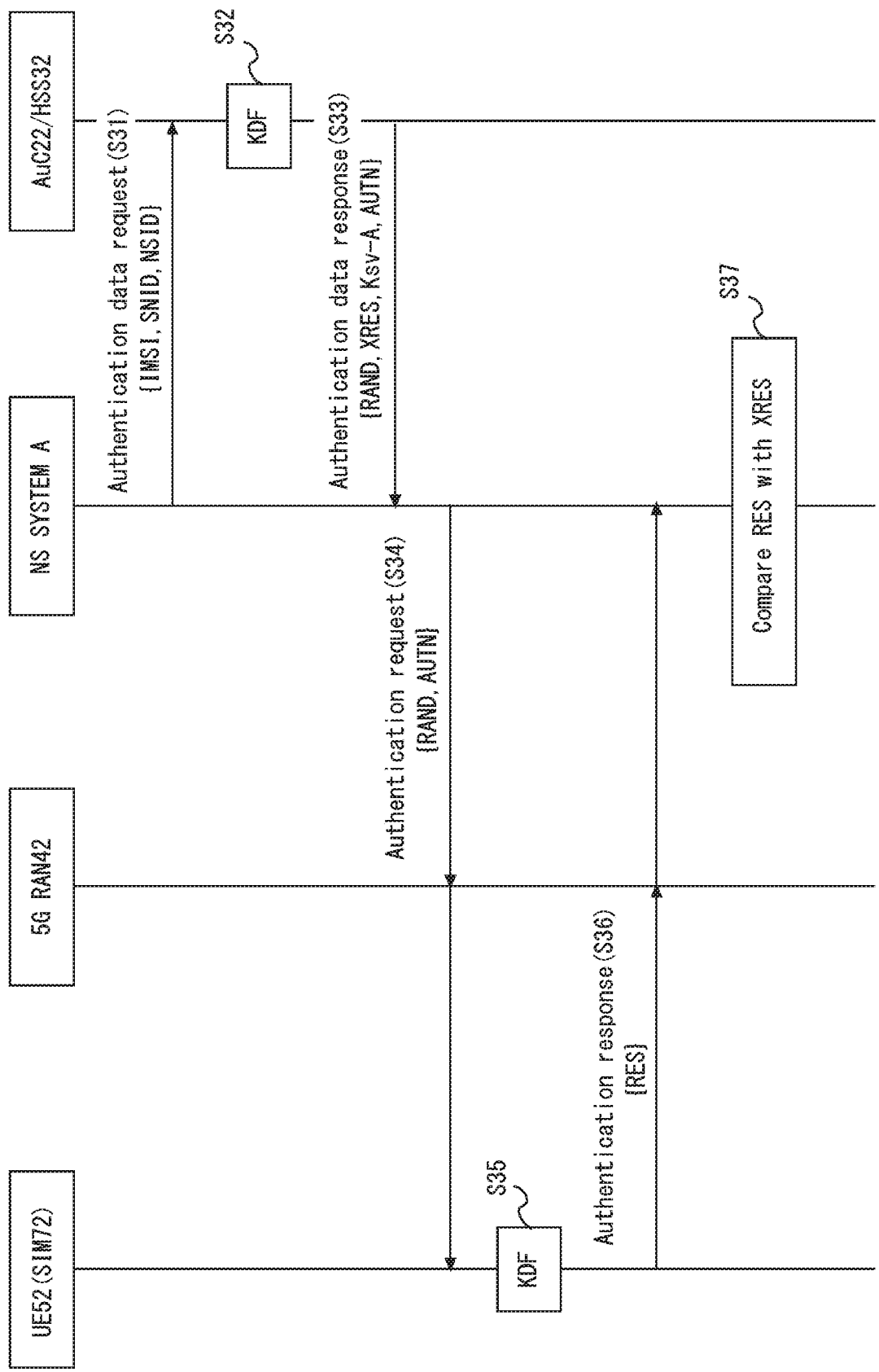
FIG. 12 is a view showing a flow of an AKA process according to the second embodiment.

The AKA process in Step S23 in FIG. 11 is described hereinafter with reference to FIG. 12. First, the NS system A transmits an Authentication data request message to the AuC 22/HSS 32 (S31). To be specific, the security device included in the NS system A may transmit the Authentication data request message to the AuC 22/HSS 32. The Authentication data request message contains IMSI (International Mobile Subscriber Identity), SNID and NSID of the UE 52. NSID is identification information indicating the NS system A.

Then, the AuC 22/HSS 32 generates Ksv-A, XRES and AUTN by KDF as described in FIG. 7 by using NSID notified from the NS system A using the Authentication data request message (S32). The AuC 22/HSS 32 then transmits an Authentication data response message to the NS system A (S33). The Authentication data response message contains RAND, XRES, Ksv-A and AUTN. RAND contained in the Authentication data response message is the same as RAND used as an input parameter when generating Ksv-A or the like in Step S32. XRES, Ksv-A and AUTN are the same as XRES, Ksv-A and AUTN generated in Step S32.

Then, the NS system A transmits an Authentication request message to the UE 52 through the 5G RAN 42 (S34). The Authentication request message contains RAND and AUTN. RAND and AUTN are RAND and AUTN received from the AuC 22/HSS 32 in Step S33.

Then, the SIM 72 mounted on the UE 52 generates Ksv-A, RES and SQN by KDF as described in FIG. 6 by using NSID of the NS system A stored in advance (S35). The UE 52 then transmits an Authentication response message to the NS system A through the 5G RAN 42 (S36). The Authentication response message contains RES. RES contained in the Authentication response message is the same as RES generated in Step S35. It is assumed in this example that an NS system to which the UE 52 can access is determined in advance, and the UE 52 previously stores NSID of this NS system. Note that, however, the UE 52 may receive NSID from the NS system A using the Authentication request message. In this case, the Authentication request message contains NSID also.

Then, the NS system A compares XRES contained in the Authentication data response message received in Step S33 and RES contained in the Authentication response message received in Step S36 (S37). When RES and XRES match in Step S37, the NS system A can determine that Ksv-A generated in the AuC 22/HSS 32 and Ksv-A generated in the SIM 72 match.

As described above, the UE 52 (SIM 72) and the AuC 22/HSS 32 according to the second embodiment of the present disclosure can generate Ksv which differs from NS system to NS system. The independence of security processing in each NS system is thereby enhanced. Accordingly, each NS system can maintain a high security level.

Third Embodiment

Figure 13:
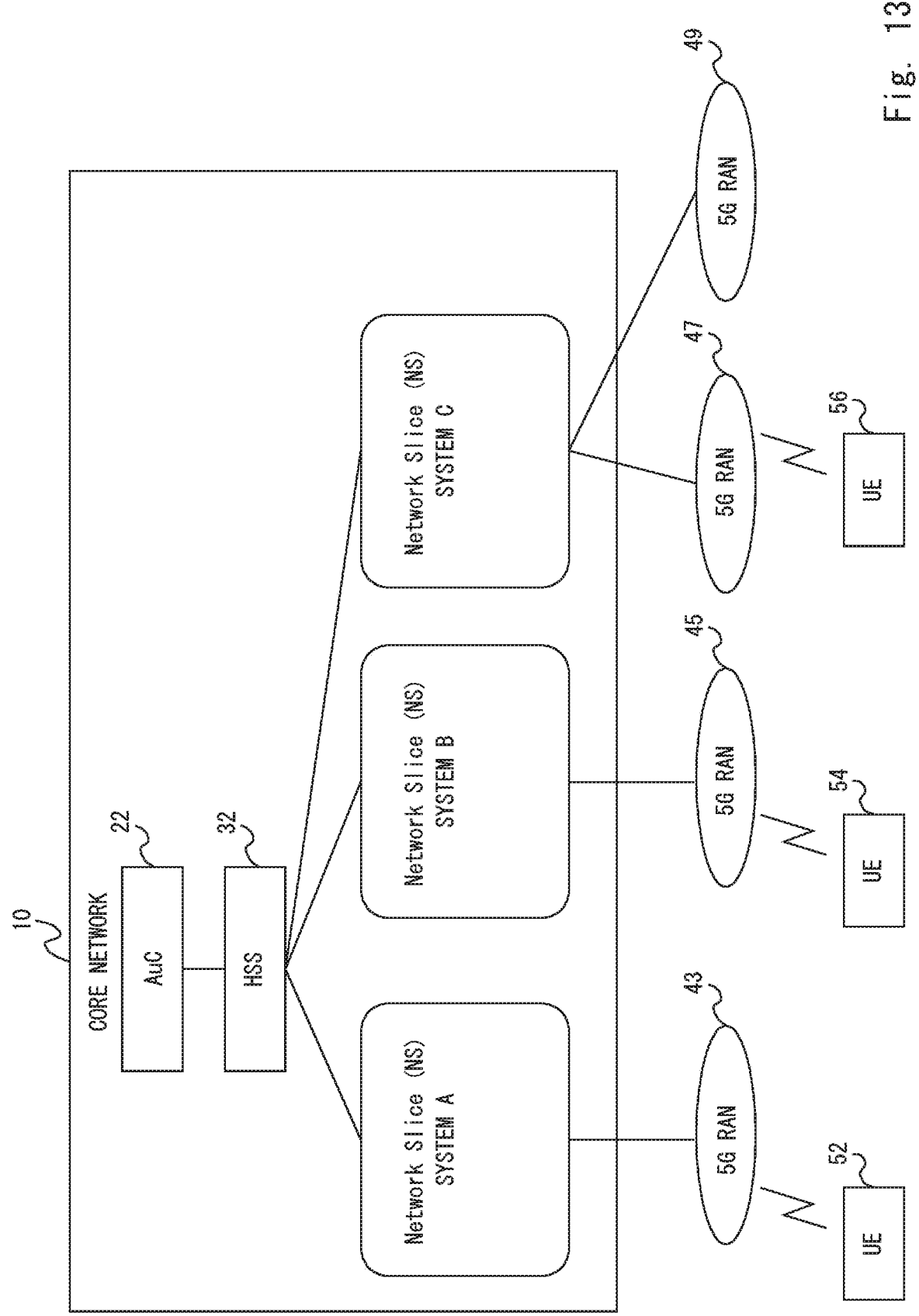
FIG. 13 is a configuration diagram of a communication system according to a third embodiment.

A configuration example of a communication system according to a third embodiment of the present disclosure is described with reference to FIG. 13. The communication system in FIG. 13 shows that a dedicated 5G RAN is allocated to each NS system. To be specific, a 5G RAN 43 is allocated to the NS system A, a 5G RAN 45 is allocated to the NS system B, and a 5G RAN 47 and a 5G RAN 49 are allocated to the NS system C.

Thus, the 5G RAN 43 is RAN that provides the same service as the NS system A, the 5G RAN 45 is RAN that provides the same service as the NS system B, and the 5G RAN 47 and the 5G RAN 49 are RAN that provide the same service as the NS system C.

The structures of keys to be used in each NS system are described hereinafter with reference to FIG. 14. Each UE also has the same key structure as the NS system to use.

Figure 14:
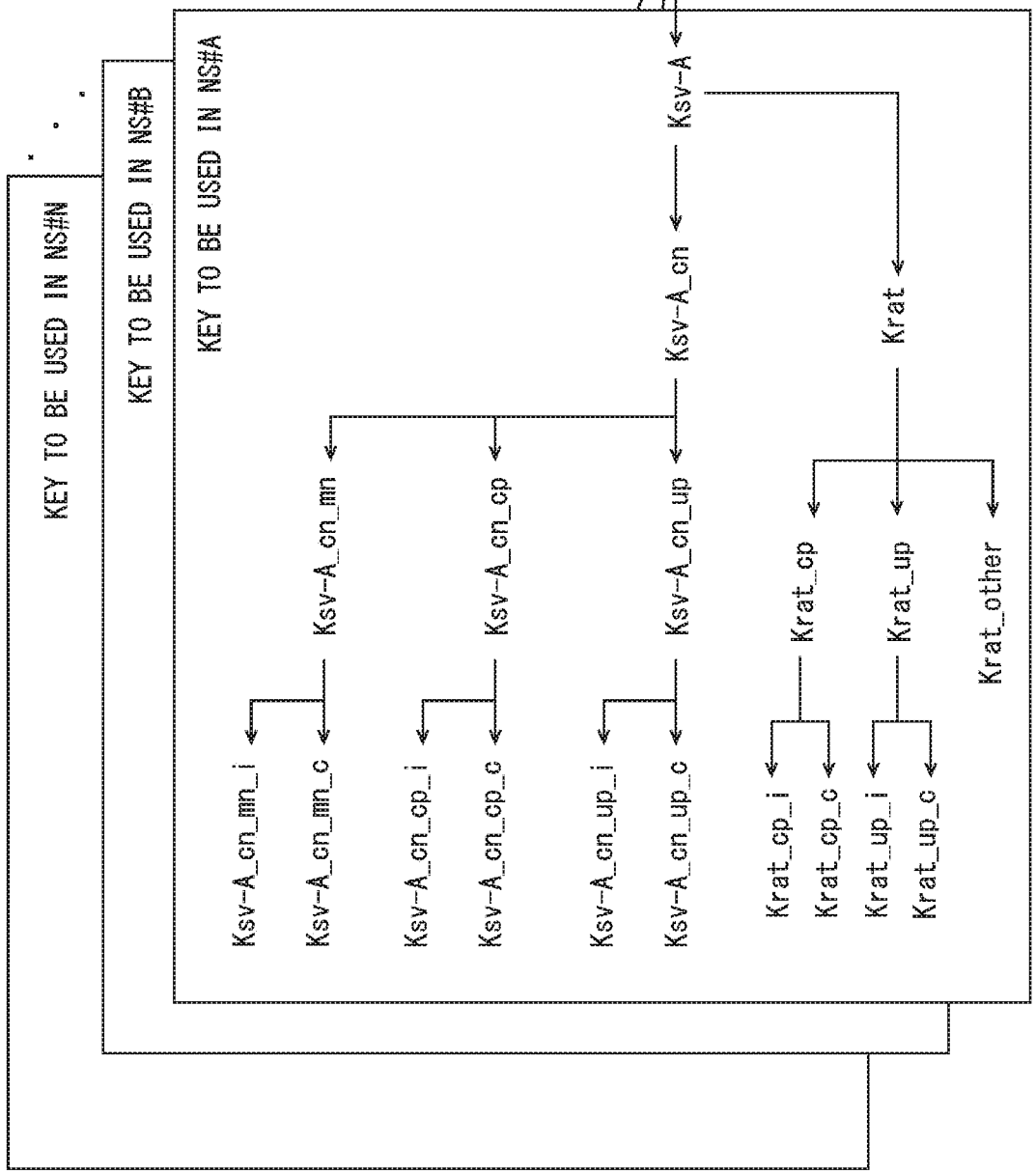
FIG. 14 is a view showing a key structure according to the third embodiment.

FIG. 14 shows that the radio key Krat is derived from the service key Ksv-A. The 5G RAN 43 is RAN that provides the same service as the NS system A. Therefore, the radio key Krat to be used in the 5G RAN 43 is derived from the service key Ksv-A to be used in the NS system A. The structures of keys subsequent to the radio key Krat are the same as those of FIG. 4, and therefore detailed description thereof is omitted.

The radio key Krat to be used in the 5G RAN 45 is derived from the service key Ksv-B to be used in the NS system B. The radio key Krat to be used in the 5G RAN 47 and the 5G RAN 49 is derived from the service key Ksv-C to be used in the NS system C.

As described above, when a 5G RAN is associated with a service to be provided as in the communication system of FIG. 13, the radio key Krat is derived in association with the service key Ksv.

Fourth Embodiment

A configuration example of a communication system according to a third embodiment of the present disclosure is described with reference to FIG. 15. The communication system in FIG. 15 has the configuration where an AuC 24 and an AuC 26 are added to the communication system in FIG. 13. The AuC 22, the AuC 24 and the AuC 26 have different master keys K from one another.

For example, the AuC 22 has a master key K-A. The master key K-A is used for derivation of the service key Ksv-A to be used in the NS system A. The AuC 24 has a master key K-B. The master key K-B is used for derivation of the service key Ksv-B to be used in the NS system B. The AuC 26 has a master key K-C. The master key K-C is used for derivation of the service key Ksv-C to be used in the NS system C.

Further, the UE 52, the UE 54 and the UE 56 have the master K for deriving the service key Ksv to be used in the NS system to use. The UE 52, the UE 54 and the UE 56 have the same configuration as the configuration shown in FIG. 10. For example, when the UE 52 can use the NS system A, the NS system B and the NS system C, it has the master key K-A, the master key K-B and the master key K-C. The UE 52 controls the master key K-A, the master key K-B and the master key K-C in the master key controller 74.

The structures of keys to be used in each NS system are described hereinafter with reference to FIG. 16. Each UE has the same key structure as the NS system to use.

Figure 16:
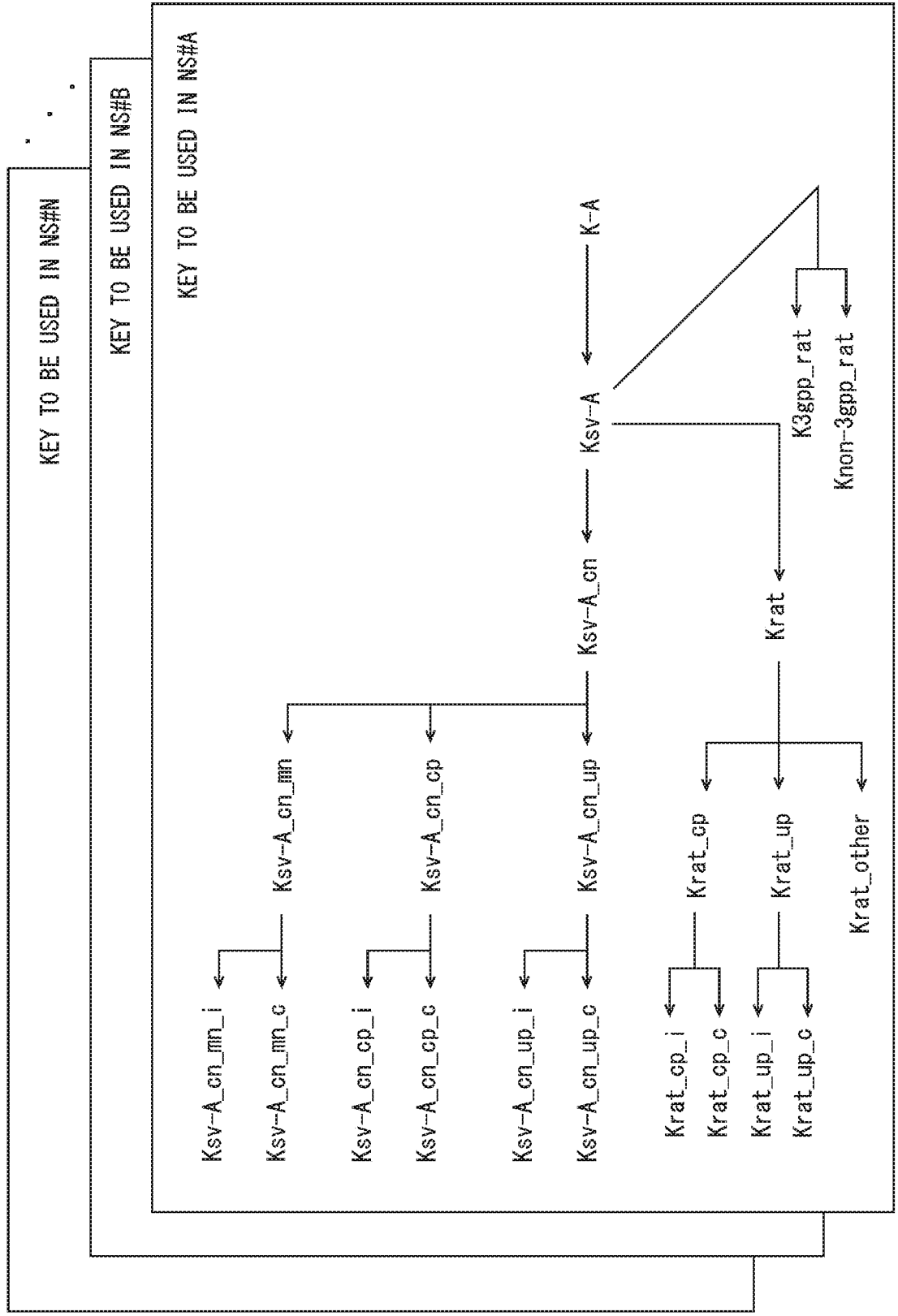
FIG. 16 is a view showing a key structure according to the fourth embodiment.

FIG. 16 shows that the service key Ksv-A is derived from the master key K-A. The structures of keys subsequent to the service key Ksv-A are the same as those of FIG. 14, and therefore detailed description thereof is omitted.

As described above, in the communication system of FIG. 15, the UE has a plurality of master keys K. Further, each AuC has different master keys K from the other AuC. Therefore, keys to be used in each NS system are derived from a master K which differs from NS system to NS system. When a master K which differs for each NS system is used, the independence of security processing is enhanced in each NS system compared with when a master key K which is common to the respective NS systems is used. Consequently, each NS system can maintain a high security level.

Further, the example in which the UE 52 has a plurality of master keys K in one SIM is described in the fourth embodiment. On the other hand, the UE 52 may have a plurality of SIMs and control a different master key for each SIM.

Fifth Embodiment

A configuration example of a communication system according to a fifth embodiment of the present disclosure is described with reference to FIG. 17. The communication system in FIG. 17 has the configuration where an HSS is associated with each NS system. To be specific, the HSS 32 connects to the AuC 22. The AuC 22 has the master key K-A. The master key K-A is used for derivation of the service key Ksv-A to be used in the NS system A. An HSS 34 connects to the AuC 24. The AuC 22 has the master key K-B. The master key K-B is used for derivation of the service key Ksv-B to be used in the NS system B. An HSS 36 connects to the AuC 26. The AuC 26 has the master key K-C. The master key K-C is used for derivation of the service key Ksv-C to be used in the NS system C.

Figure 18:
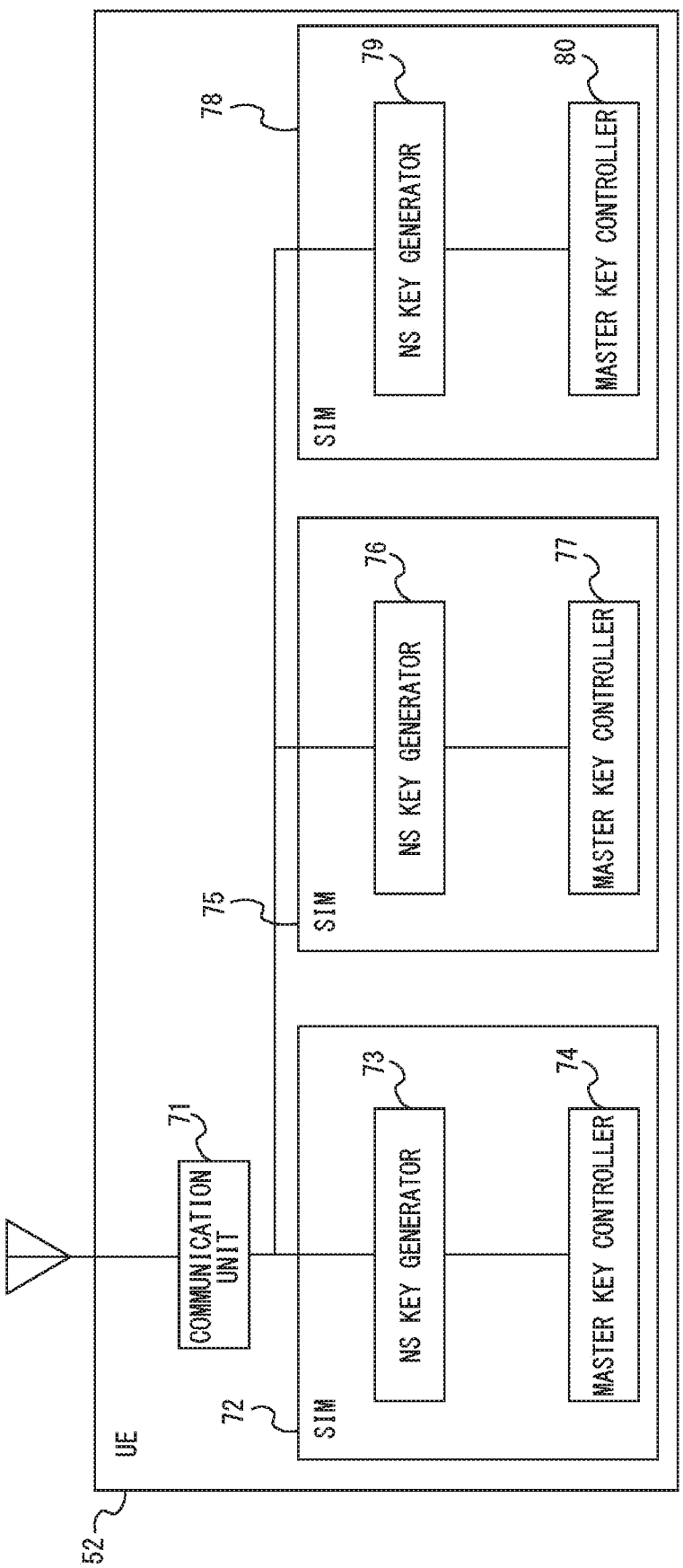
FIG. 18 is a configuration diagram of a UE according to the fifth embodiment.

A configuration example of the UE 52 according to the fifth embodiment of the present disclosure is described hereinafter with reference to FIG. 18. The UE 52 in FIG. 8 has the configuration where a SIM 75 and a SIM 78 are added to the UE 52 in FIG. 10. The SIM 75 includes an NS key generator 76 and a master key controller 77. The SIM 78 includes an NS key generator 79 and a master key controller 80.

For example, the master key controller 74 may have the master key K-A, the master key controller 77 may have the master key K-B, and the master key controller 80 may have the master key K-C. Further, the NS key generator 73 generates the keys to be used in the NS system A shown in FIG. 16. The NS key generator 76 generates the keys to be used in the NS system B. The NS key generator 79 generates the keys to be used in the NS system C.

Figure 15:
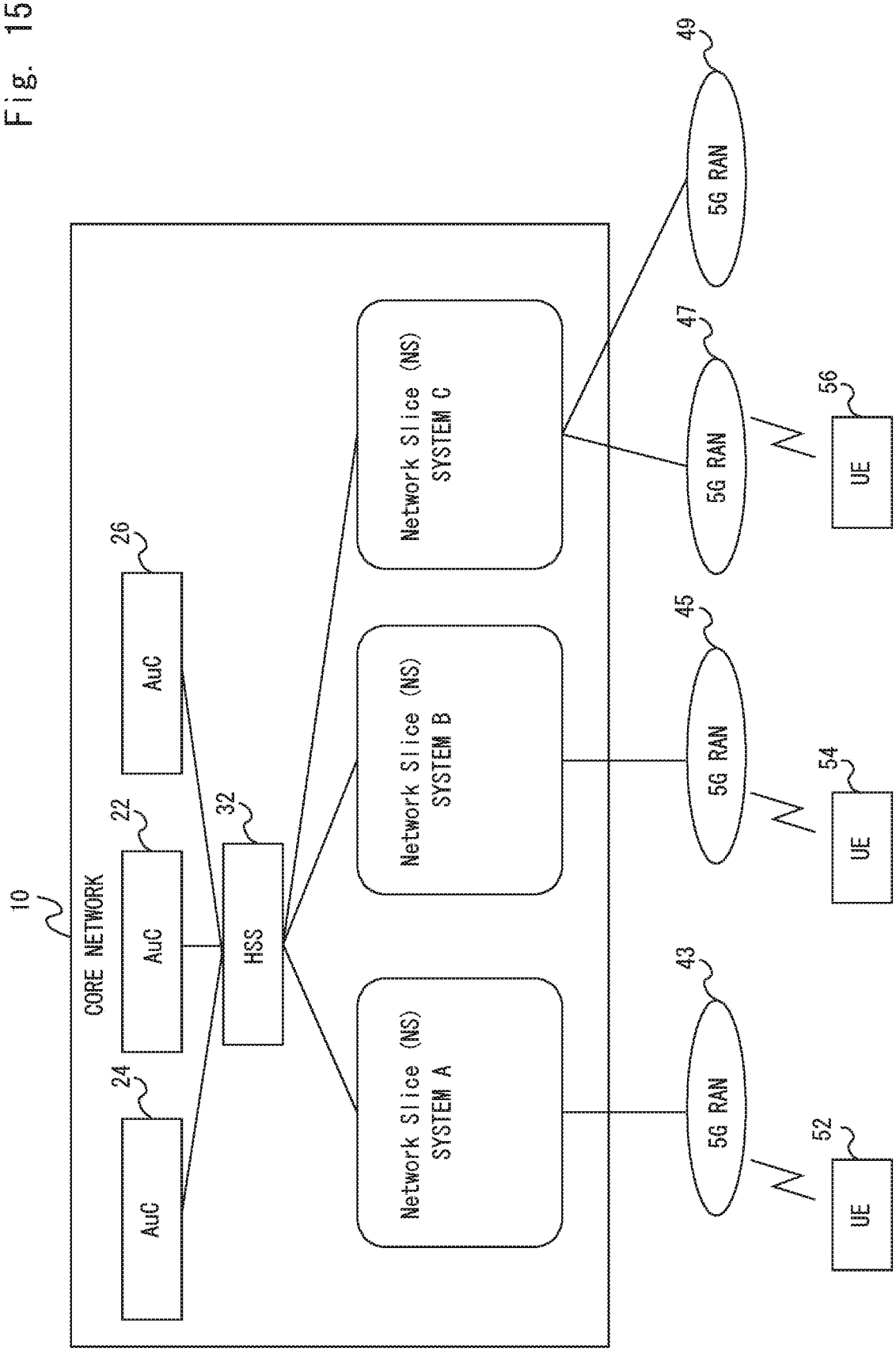
FIG. 15 is a configuration diagram of a communication system according to a fourth embodiment.

As described above, in the communication system in FIG. 17, the UE has a plurality of master keys K, just like in the communication system in FIG. 15. Further, each AuC has a master key K which differs from the other AuC. Therefore, keys to be used in each NS system are derived from a master K which differs from NS system to NS system. When a master K which differs for each NS system is used, the independence of security processing in each NS system is enhanced compared with when a master key K which is common to the respective NS systems is used.

Figure 17:
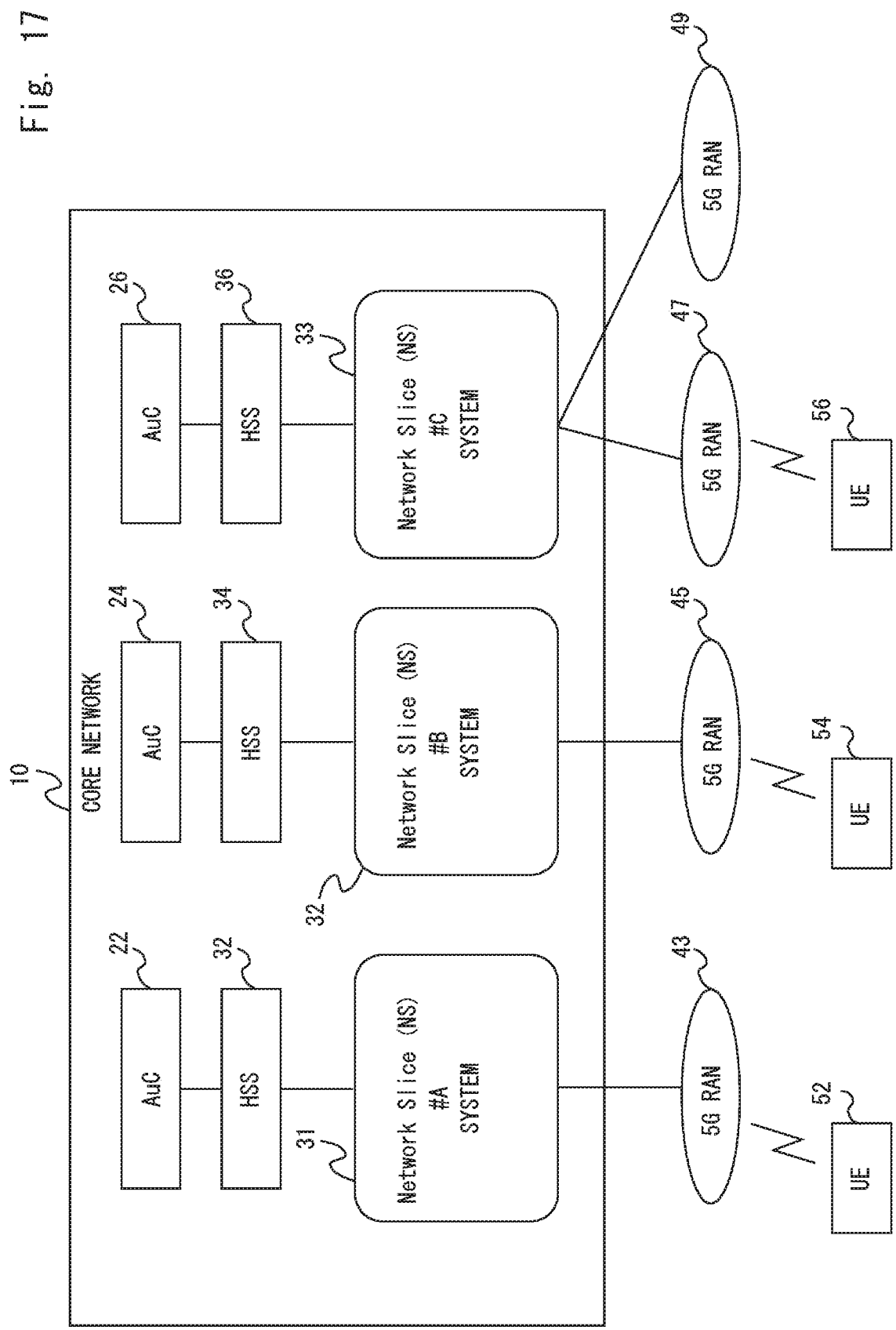
FIG. 17 is a configuration diagram of a communication system according to a fifth embodiment.

Further, in FIG. 17, each of the AuC connects to a different HSS from each other. For example, a telecommunications carrier that manages the HSS 32 differs from telecommunications carriers that manage the HSS 34 and the HSS 36, and a telecommunications carrier that manages the HSS 34 differs from a telecommunications carrier that manages the HSS 36. In this case, as shown in FIG. 18, the UE 52 may include the SIM 72 provided by the telecommunications carrier that manages the HSS 32, the SIM 75 provided by the telecommunications carrier that manages the HSS 34, and the SIM 78 provided by the telecommunications carrier that manages the HSS 36. In this manner, since one UE has a plurality of SIMs, each SIM can control a master key K to be used by a telecommunications carrier that provides each SIM.

Further, the example in which the UE 52 has a plurality of SIMs and controls a master key K which differs for each SIM is described in the fifth embodiment. On the other hand, the UE 52 may control a plurality of SIMs in one SIM.

Sixth Embodiment

Figure 19:
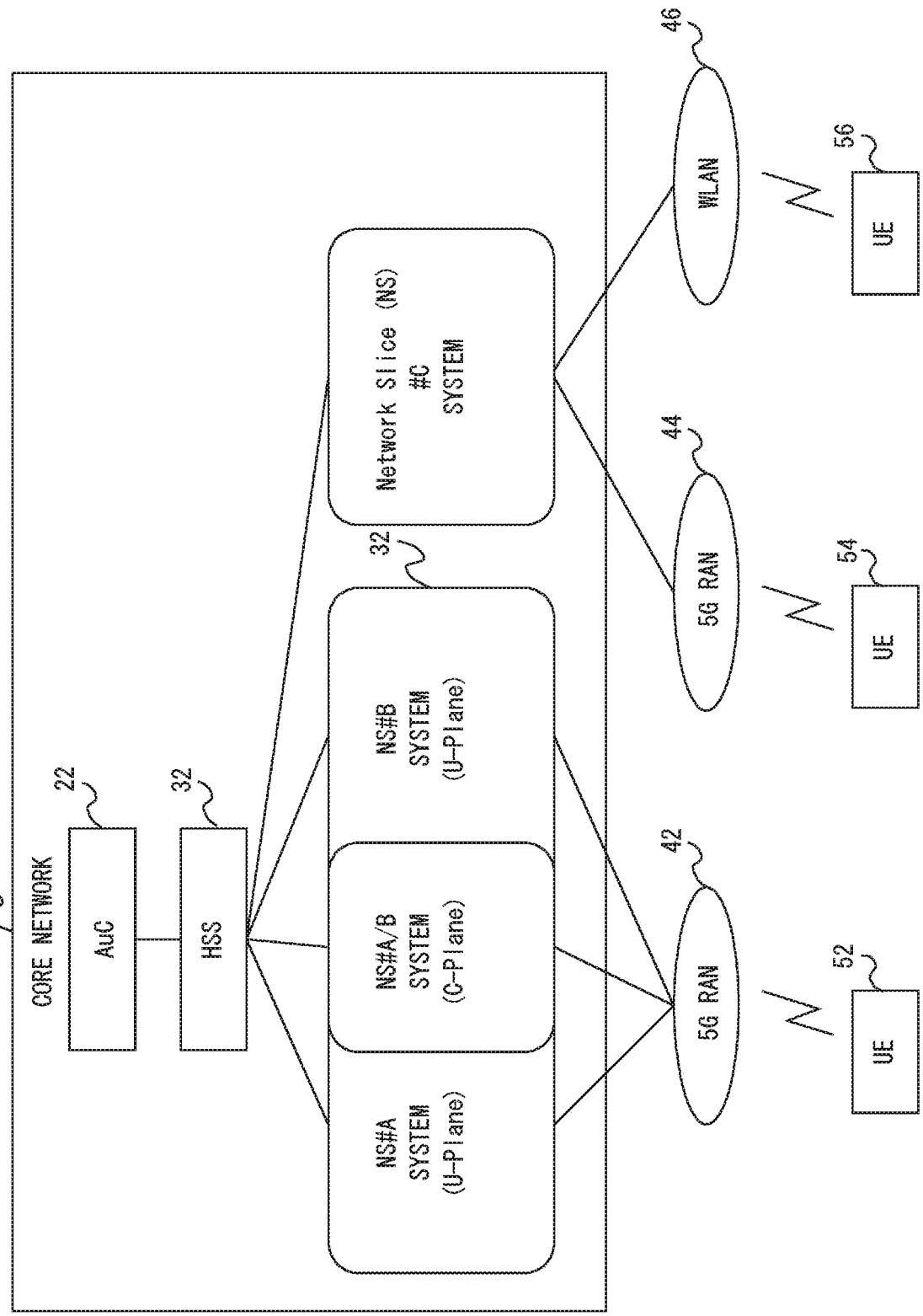
FIG. 19 is a configuration diagram of a communication system according to a sixth embodiment.

A configuration example of a communication system according to a sixth embodiment of the present disclosure is described with reference to FIG. 19. The communication system in FIG. 19 shows that the NS system A and the NS system B share a system for transmitting control plane data. On the other hand, a system for transmitting user plane data of the NS system A and a system for transmitting user plane data of the NS system B are independent of each other. The configuration of RAN in the communication system of FIG. 19 is the same as that of FIG. 3, and therefore detailed description thereof is omitted.

The system shared by the NS system A and the NS system B is referred to as the NS system A/B. Further, although FIG. 19 shows that the NS system A/B is a system for transmitting control plane data, the NS system A/B may be a system for transmitting user plane data. In this case, a system for transmitting control plane data of the NS system A and a system for transmitting control plane data of the NS system B may be independent of each other.

Figure 20:
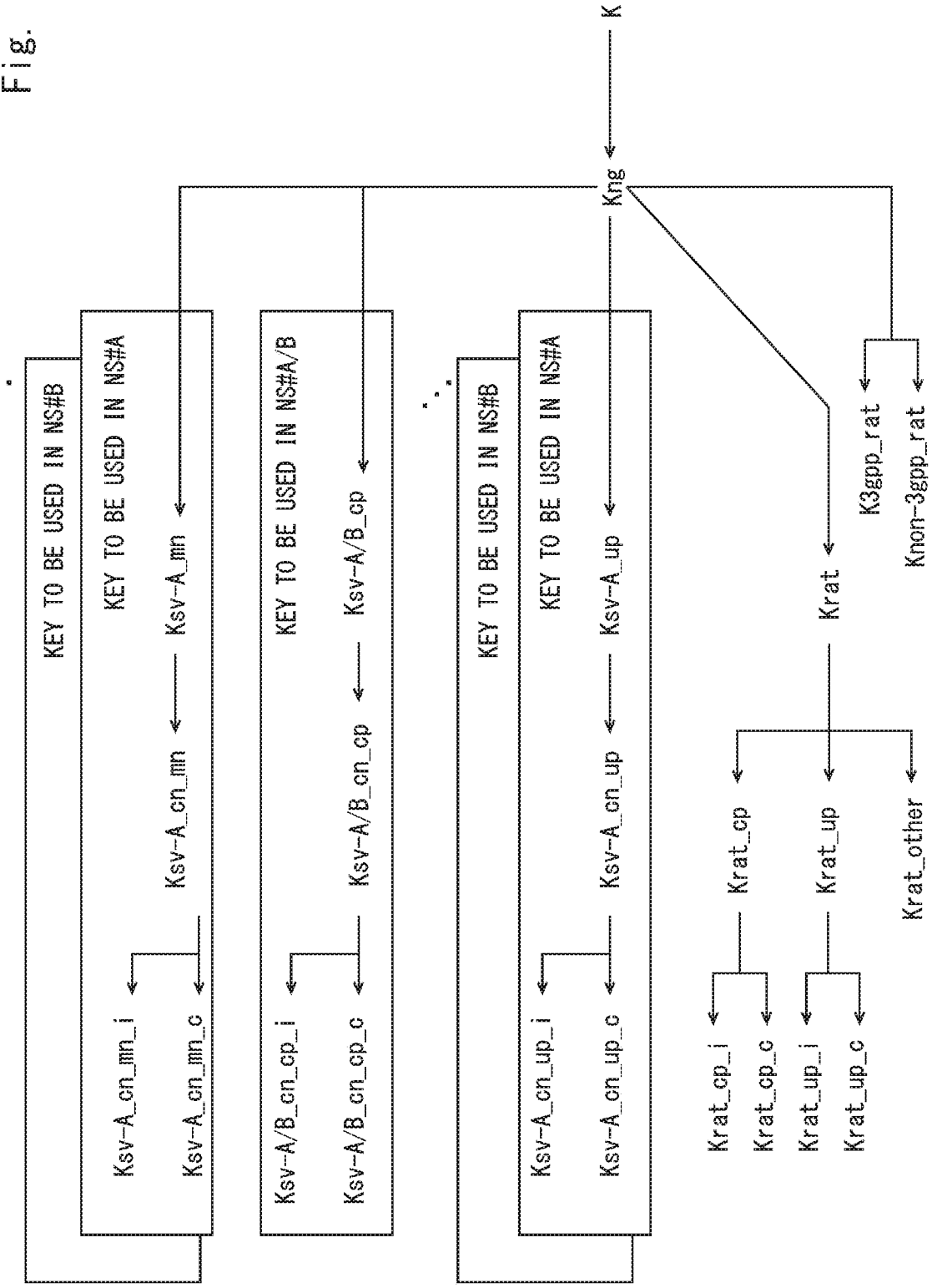
FIG. 20 is a view showing a key structure according to the sixth embodiment.

The structures of keys to be used in each NS system in FIG. 19 are described hereinafter with reference to FIG. 20. Each US has the same key structure as the NS system to use.

A service key Ksv-A_up to be used for transmission of user plane data of the NS system A is derived from the secondary key Kng. A service key Ksv-B_up to be used for transmission of user plane data of the NS system B is also derived from the secondary key Kng.

A service key Ksv-A_cn_up is derived from the service key Ksv-A_up. The service key Ksv-A_cn_up is a key to be used for security processing related to user plane data of the NS system A. Further, a service key Ksv-A_cn_up_i and a service key Ksv-A_cn_up_c are derived from the service key Ksv-A_cn_up. Service keys related to user plane data of the NS system B are derived in the same way as the service keys related to user plane data of the NS system A, and therefore detailed description thereof is omitted.

A service key Ksv-A_mn to be used for transmission of data other than user plane data and control plane data of the NS system A is derived from the secondary key Kng. A service key Ksv-B_mn to be used for transmission of data other than user plane data and control plane data of the NS system B is also derived from the secondary key Kng.

A service key Ksv-A_cn_mn is derived from the service key Ksv-A_mn. The service key Ksv-A_cn_mn is a key to be used for security processing related to data other than user plane data and control plane data of the NS system A. Further, a service key Ksv-A_cn_mn_i and a service keyKsv-A_cn_mn_c are derived from the service key Ksv-A_cn_mn. Service keys related to user plane data of the NS system B are derived in the same way as the service keys related to user plane data of the NS system A, and therefore detailed description thereof is omitted.

A service key Ksv-A/B_cp to be used for transmission of control plane data of the NS system A/B is derived from the secondary key Kng.

A service key Ksv-A/B_cn_cp is derived from the service key Ksv-A/B_cp. The service key Ksv-A/B_cn_cp is a key to be used for security processing related to control plane data of the NS system A and the NS system B. Further, a service key Ksv-A/B_cn_cp_i and a service key Ksv-A/B_cn_cp_c are derived from the service key Ksv-A/B_cn_cp.

The flow of an Attach process to the NS system A related to the UE 52 is described hereinafter with reference to FIG. 21. The UE 52 (SIM 72) means that the UE 52 includes the SIM 72. Further, the AuC 22/HSS 32 means that it is the AuC 22 or the HSS 32.

Steps S41 and S42 are the same as Steps S21 and S22 in FIG. 11, and therefore detailed description thereof is omitted. Then, an AKA process is performed among the UE 52, the NS system A and the AuC 22/HSS 32. This AKA process is performed for generating the service key Ksv-A/B_cp to be used for transmission of control plane data of the NS system A/B (S43). The detailed procedure of the AKA process is the same as the procedure shown in FIG. 12 and thus not redundantly described. Likewise, detailed description of the AKA process is omitted below.

After that, an AKA process is performed among the UE 52, the NS system A and the AuC 22/HSS 32. This AKA process is performed for generating the service key Ksv-A/B_up to be used for transmission of user plane data of the NS system A (S44). Further, an AKA process is performed among the UE 52, the NS system A and the AuC 22/HSS 32. This AKA process is performed for generating the service key Ksv-A_mn to be used for transmission of data other than user plane data and control plane data of the NS system A (S45).

Steps S46 to S49 are the same as Steps S24 to S27 in FIG. 11, and therefore detailed description thereof is omitted.

Figure 21:
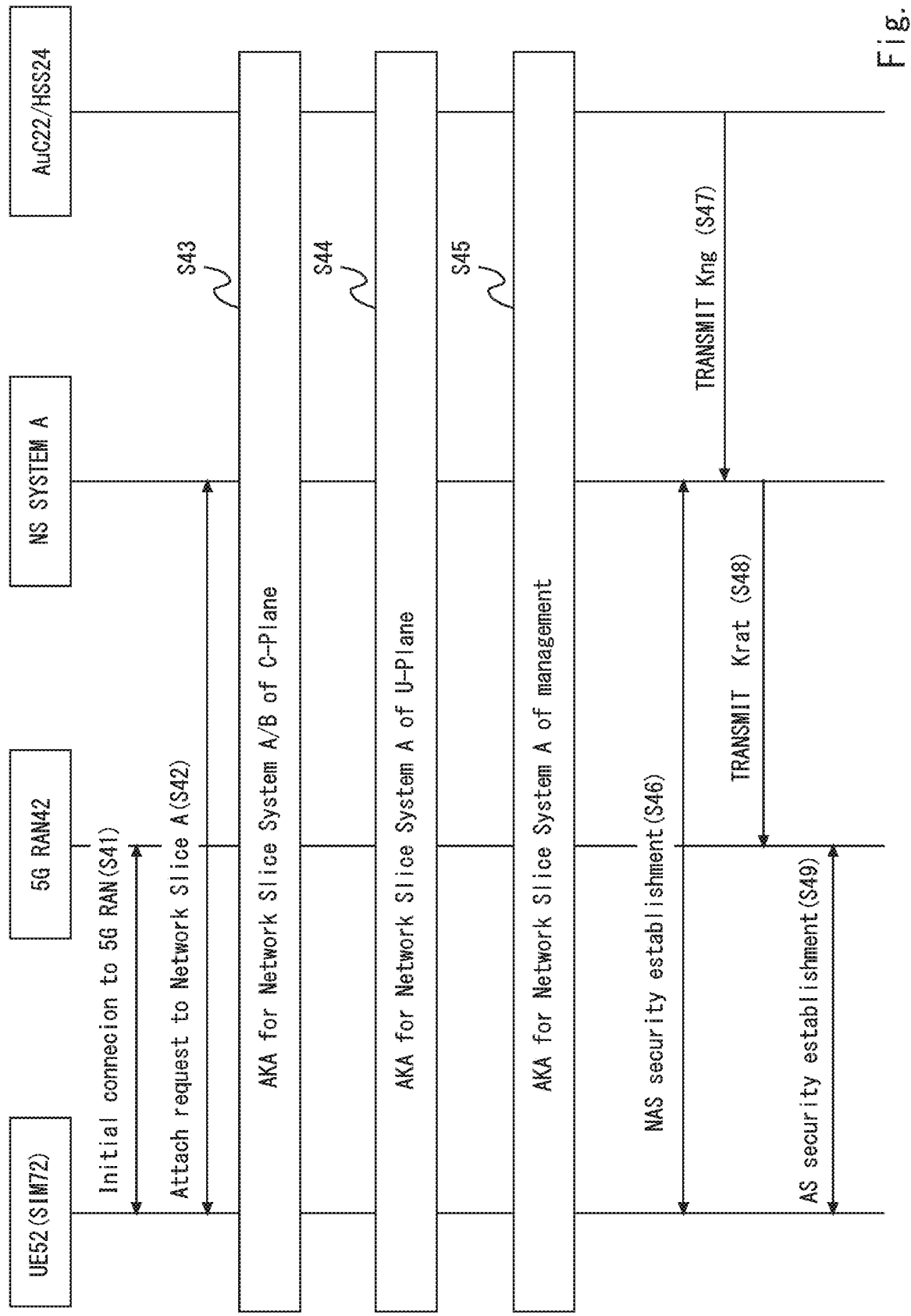
FIG. 21 is a view showing a flow of an Attach process according to the sixth embodiment.
Figure 22:
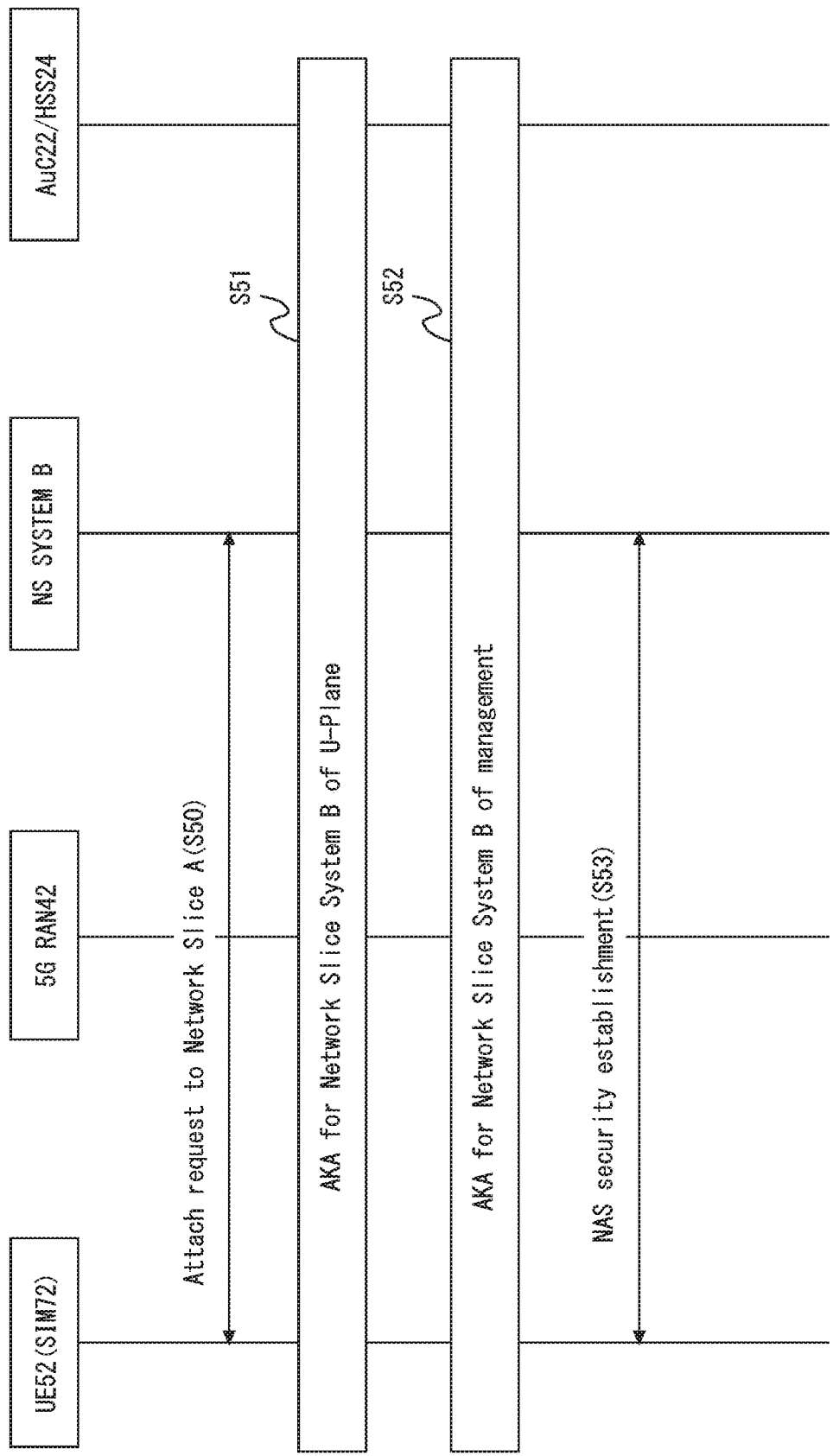
FIG. 22 is a view showing a flow of an Attach process according to the sixth embodiment.

Referring to FIG. 22, the flow of an Attach process to the NS system B related to the UE 52 is described hereinafter. Step S50 related to the UE 52 is the same as Step S42 in FIG. 22, and detailed description thereof is omitted. Further, Steps S51 to S53 are the same as Steps S44 to S46 in FIG. 21, and detailed description thereof is omitted.

Note that, in FIG. 22, an AKA process for generating the service key Ksv-A/B_cp to be used for transmission of control plane data of the NS system A/B as in S43 in FIG. 21 is not carried out among the UE 52, the NS system A and the AuC 22/HSS 32. This is because the service key Ksv-A/B_cp is already generated in the UE 52 and the AuC 22/HSS 32 in Step S43.

Alternatively, an AKA process may be carried out also in the Attach process to the NS system B related to the UE 52, just like in Step S43 in FIG. 21. The AKA process in Step S43 is performed among the UE 52, the NS system A and the AuC 22/HSS 32 for generating the service key Ksv-A/B_cp to be used for transmission of control plane data of the NS system A/B.

As described above, when the NS system A/B that is shared by the NS system A and the NS system B exists as shown in FIG. 19, the UE 52 and the AuC 22/HSS 32 can generate service keys to be used in the NS system A/B. The UE 52 and the AuC 22/HSS 32 may generate the service keys to be used in the NS system A/B in the Attach process of any one of the NS system A and the NS system B. As a result, the processing load on the UE 52 and the AuC 22/HSS 32 can be reduced compared with when the service keys to be used in the NS system A/B is generated in the Attach process of the NS system A and the NS system B.

Seventh Embodiment

The flow of an Attach process related to the UE 52, which differs from that shown in FIG. 11, is described hereinafter with reference to FIG. 23. The UE 52 (SIM 72) means that the UE 52 includes the SIM 72. Further, the AuC 22/HSS 32 means that it is the AuC 22 or the HSS 32.

First, the UE 52 starts a connection process with the 5G RAN 42 (S61). For example, in order to communicate with a base station placed in the 5G RAN 42, the UE 52 connects to the base station through a wireless communication line.

Next, the AKA process is performed among the UE 52, the NS system A and the AuC 22/HSS 32 (S62). As a result that the AKA process in Step S62 is carried out, it can be verified in the UE 52 and the AuC 22/HSS 32 that the secondary key Kng generated in the UE 52 and the secondary key Kng generated in the AuC 22/HSS 32 match. Further, in Step S62, the AKA process may be performed in a system that differs from the NS system A or a system that manages NS.

Figure 23:
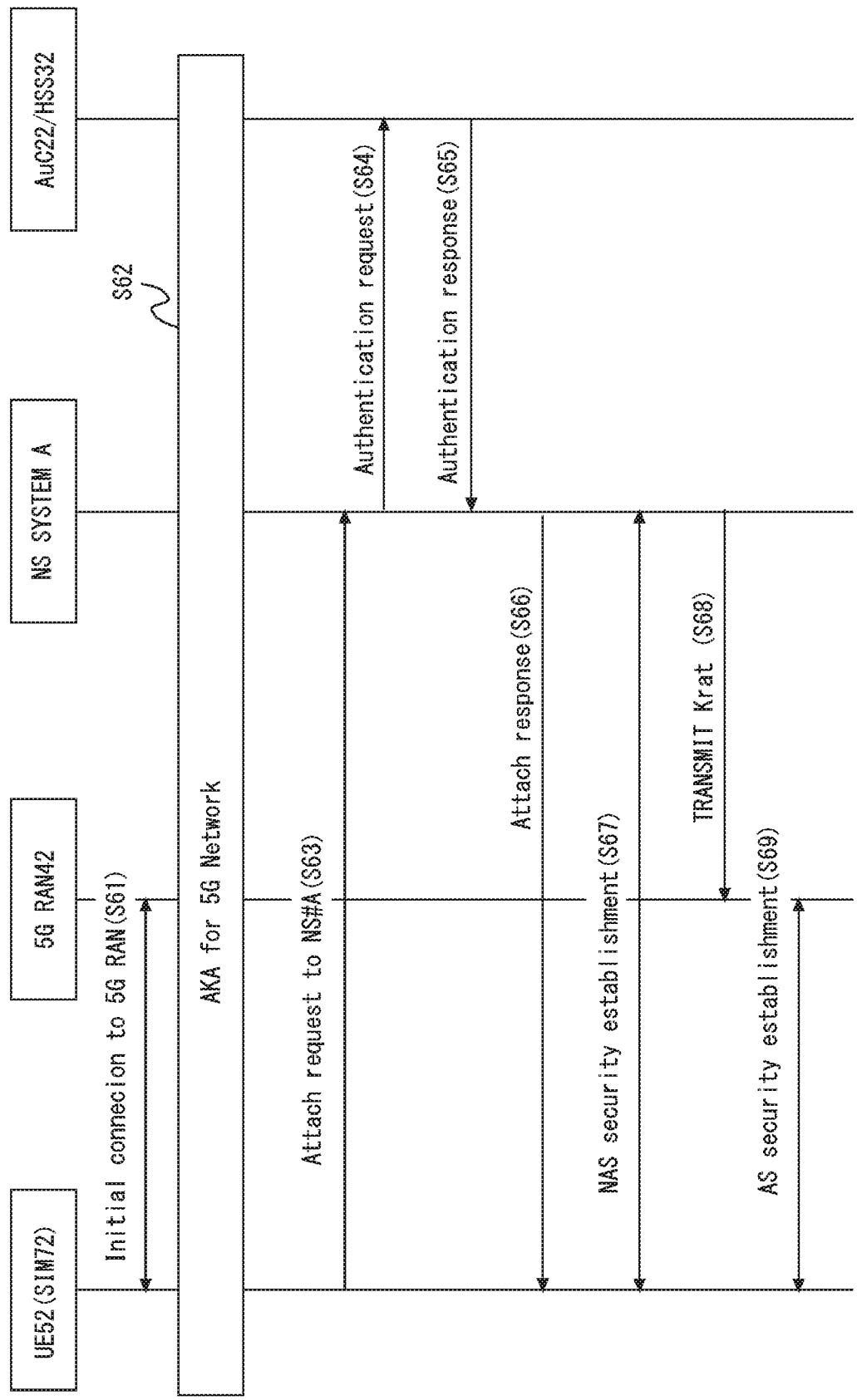
FIG. 23 is a view showing a flow of an Attach process according to a seventh embodiment.
Figure 24:
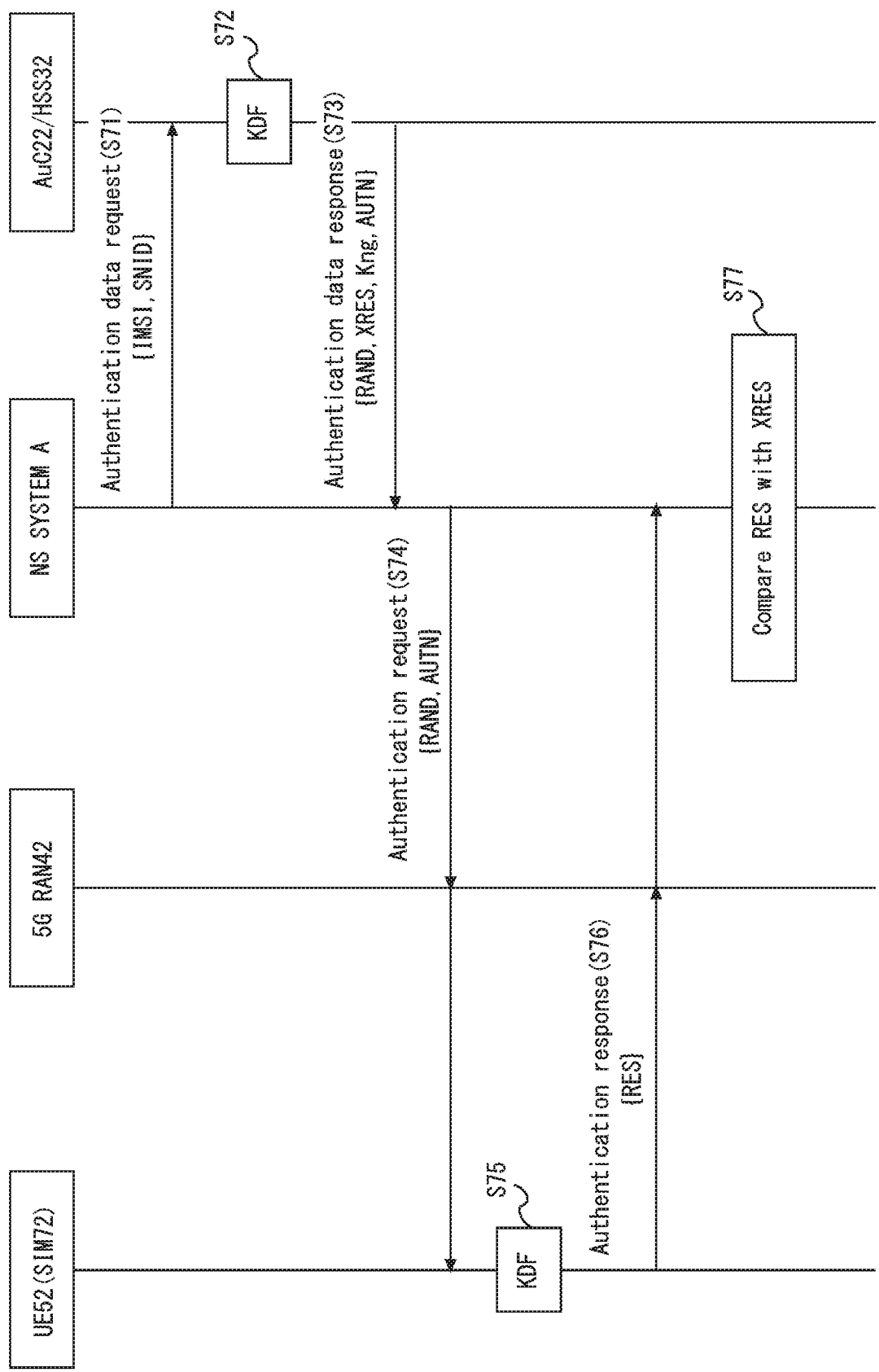
FIG. 24 is a view showing a flow of an AKA process according to the seventh embodiment.

The AKA process in Step S62 in FIG. 23 is described hereinafter with reference to FIG. 24. Although FIG. 24 shows an example in which the NS system A is used as the core network, an NS system different from the NS system A may be used. First, the NS system A transmits an Authentication data request to the AuC 22/HSS 32 (S71). To be specific, a security device included in the NS system A may transmit the Authentication data request message to the AuC 22/HSS 32. The Authentication data request message contains IMSI (International Mobile Subscriber Identity) and SNID of the UE 52.

Figure 25:
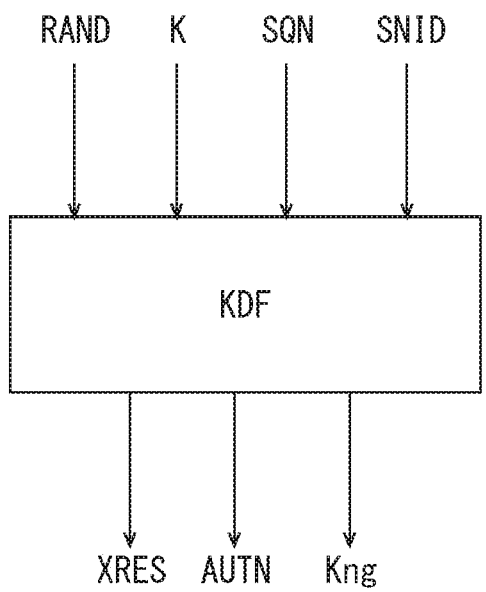
FIG. 25 is a view showing a derivation method of a service key Ksv in an AuC according to the seventh embodiment.

Next, the AuC 22/HSS 32 generates Kng, XRES and AUTN by using KDF (S72). To be specific, as shown in FIG. 25, XRES, AUTN and the secondary key Kng are output as a result that the master key K, SNID, RAND and SQN are input to KDF. The derivation of the secondary key Kng on the core network 10 side may be carried out in any of the AuC 22 and the HSS 32.

Referring back to FIG. 24, the AuC 22/HSS 32 then transmits an Authentication data response message to the NS system A (S73). The Authentication data response message contains RAND, XRES, Kng and AUTN. RAND contained in the Authentication data response message is the same as RAND used as an input parameter when generating Kng in Step S72. XRES, Kng and AUTN are the same as XRES, Kng and AUTN generated in Step S72.

Then, the NS system A transmits an Authentication request message to the UE 52 through the 5G RAN 42 (S74). The Authentication request message contains RAND and AUTN. RAND and AUTN are RAND and AUTN received from the AuC 22/HSS 32 in Step S73.

Figure 26:
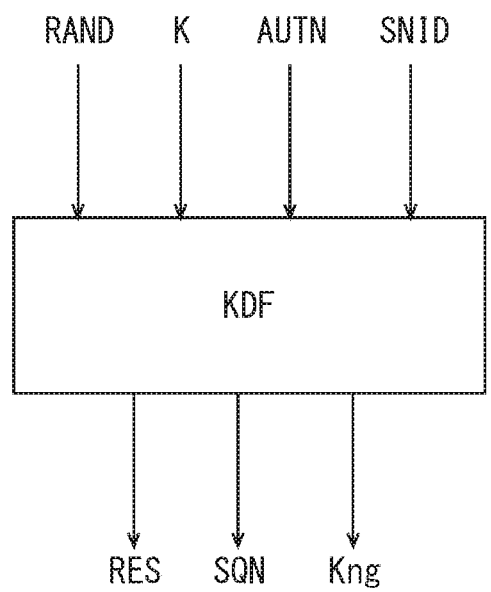
FIG. 26 is a view showing a derivation method of a service key Ksv in a UE according to the seventh embodiment.

After that, the SIM 72 generates Kng and RES by using KDF (S35). To be specific, as shown in FIG. 26, RES, SQN, and the secondary key Kng are output as a result that the master key K, SNID, RAND and AUTN are input to KDF.

Referring back to FIG. 24, the UE 52 then transmits an Authentication response message to the NS system A through the 5G RAN 42 (S76). The Authentication response message contains RES. RES contained in the Authentication response message is the same as RES generated in Step S75.

Then, the NS system A compares XRES contained in the Authentication data response message received in Step S73 and RES contained in the Authentication response message received in Step S76 (S77). When RES and XRES match in Step S37, the NS system A can determine that the secondary key Kng generated in the AuC 22/HSS 32 and the secondary key Kng generated in the SIM 72 match.

Referring back to FIG. 23, the UE 52 then transmits an Attach request message to the NS system A through the 5G RAN 42 (S63). The Attach request message contains IMSI (International Mobile Subscriber Identity) of the UE 52.

Then, the NS system A transmits an Authentication request message to the AuC 22/HSS 32 (S64). To be specific, a security device included in the NS system A may transmit the Authentication request message to the AuC 22/HSS 32. The Authentication request message contains IMSI (International Mobile Subscriber Identity) and NSID of the UE 52.

The AuC 22/HSS 32 then transmits an Authentication response message to the NS system A (S65). The Authentication response message contains Ksv-A generated by the AuC 22/HSS 32.

After that, the NS system A transmits an Attach response message to the UE 52 (S66). The SIM 72 receives the Attach response message and then generates the service key Ksv-A. Steps S67 to S69 are the same as Steps S24, S26 and S27 in FIG. 11, and therefore detailed description thereof is omitted. The NS system A generates the radio key Krat by using the secondary key Kng received from the AuC 22/HSS 32 in Step S62. The NS system A transmits the generated radio key Krat to the 5G RAN 42 in Step S68.

As described above, by carrying out the Attach process in FIG. 23, the UE 52 and the AuC 22/HSS 32 can use AKA for generation of the secondary key Kng. The UE 52 and the AuC 22/HSS 32 can thereby verify that the secondary key Kng generated in the UE 52 and the secondary key Kng generated in the AuC 22/HSS 32 match. The UE 52 and the AuC 22/HSS 32 can generate the service key Ksv in the same manner as in the other embodiments by using the secondary key Kng verified to match each other.

It should be noted that the present disclosure is not limited to the above-described embodiments and may be varied in many ways within the scope of the present disclosure. Further, in this disclosure, embodiments can be combined as appropriate.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-089050 filed on Apr. 27, 2016, the disclosure of which is incorporated herein in its entirety by reference.

Further, the whole or part of the embodiments disclosed above can be described as, but not limited to, the following supplementary notes.

Supplementary Note 1
A key generation method comprising:
specifying network slice identification information indicating a network slice system providing a service to be used by a communication terminal among a plurality of network slice systems included in a core network; and
generating a service key to be used for security processing in the network slice system indicated by the network slice identification information by using the network slice identification information.

Supplementary Note 2
The key generation method according to Supplementary Note 1, wherein, when one master key is allocated to the communication terminal, the generating a service key generates a service key to be used for security processing in the network slice system indicated by the network slice identification information by using the master key and the network slice identification information.

Supplementary Note 3
The key generation method according to Supplementary Note 2, further comprising:
by using the master key and radio identification information indicating a radio access network used by the communication terminal, generating a radio key to be used for security processing in the radio access network.

Supplementary Note 4
The key generation method according to Supplementary Note 1, wherein when a master key different for each of the network slice systems is allocated to the communication terminal, the generating a service key generates a service key to be used for security processing in the network slice system indicated by the network slice identification information by using a master key associated with the network slice system providing a service to be used by the communication terminal and the network slice identification information.

Supplementary Note 5
The key generation method according to Supplementary Note 4, further comprising:
by using the service key and radio identification information indicating a radio access network used by the communication terminal, generating a radio key to be used for security processing in the radio access network.

Supplementary Note 6
The key generation method according to any one of Supplementary Notes 1 to 5, wherein when a common key is used in a first network slice system and a second network slice system among the plurality of network slice systems included in the core network, the generating a service key generates a common service key to be used for security processing of the first network slice system and the second network slice system in any one of the first network slice system and the second network slice system.

Supplementary Note 7
A communication device comprising:
a key generator configured to generate, by using network slice identification information indicating a network slice providing a service to be used by a communication terminal among a plurality of network slice systems included in a core network, a service key to be used in the network slice indicated by the network slice identification information.

Supplementary Note 8
A communication terminal comprising:
a key generator configured to generate, by using network slice identification information indicating a network slice system providing a service to use among a plurality of network slice systems included in a core network, a service key to be used for security processing in the network slice system indicated by the network slice identification information.

Supplementary Note 9
The communication terminal according to Supplementary Note 8, further comprising:
a SIM configured to have one allocated master key,
wherein the key generator generates, by using first network slice identification information indicating a first network slice system among a plurality of network slice systems included in a core network and the master key, a first service key to be used for security processing in the first network slice system, and generates, by using second network slice identification information indicating a second network slice system among the plurality of network slice systems included in the core network and the master key, a second service key to be used for security processing in the second network slice system.

Supplementary Note 10
The communication terminal according to Supplementary Note 9, wherein the key generator is included in the SIM.

Supplementary Note 11
The communication terminal according to Supplementary Note 8, further comprising:
a first SIM configured to have a first master key associated with a first network slice system among the plurality of network slice systems included in the core network; and
a second SIM configured to have a second master key associated with a second network slice system among the plurality of network slice systems included in the core network,
wherein the key generator includes a first key generator configured to generate a first service key to be used for security processing in the first network slice system by using first network slice identification information indicating the first network slice system and the first master key, and a second key generator configured to generate a second service key to be used for security processing in the second network slice system by using second network slice identification information indicating the second network slice system and the second master key.

Supplementary Note 12

The communication terminal according to Supplementary Note 11, wherein
the first key generator is included in the first SIM, and
the second key generator is included in the second SIMI.

Supplementary Note 13

A communication system comprising:
a communication terminal configured to generate, by using network slice identification information indicating a network slice providing a service to use among a plurality of network slice systems included in a core network, a service key to be used for security processing in the network slice indicated by the network slice identification information; and
a communication device configured to generate, by using network slice identification information indicating a network slice system providing a service to be used by the communication terminal among the plurality of network slice systems included in the core network, a service key to be used for security processing in the network slice indicated by the network slice identification information.

REFERENCE SIGNS LIST

A NS SYSTEM
B NS SYSTEM
10 CORE NETWORK
20 COMMUNICATION DEVICE
22 AuC
24 AuC
26 AuC
32 HSS
34 HSS
36 HSS
40 RAN
42 5G RAN
43 5G RAN
44 5G RAN
45 5G RAN
46 WLAN
47 5G RAN
49 5G RAN
50 COMMUNICATION TERMINAL
52 UE
54 UE
56 UE
61 MASTER KEY CONTROLLER
62 NS KEY GENERATOR
63 COMMUNICATION UNIT
71 COMMUNICATION UNIT
72 SIM
73 NS KEY GENERATOR
74 MASTER KEY CONTROLLER
75 SIM
76 NS KEY GENERATOR
77 MASTER KEY CONTROLLER
78 SIM
79 NS KEY GENERATOR
80 MASTER KEY CONTROLLER
201 NS KEY GENERATOR
501 NS KEY GENERATOR

The invention claimed is:

1. A communication method performed by a communication system including a first network slice system and a second network slice system, the communication method comprising:
sending, by the first network slice system to an authentication server, a first authentication data request message, wherein the first authentication data request message includes first information on the first network slice system;
receiving, by the first network slice system from the authentication server, a first authentication data response message corresponding to the first authentication data request message;
after receiving the first authentication data response message, sending, by the first network slice system to a communication terminal, a first authentication request message generated based on the first authentication data response message; and
receiving, from the communication terminal by the first network slice system, a first authentication response message corresponding to the first authentication request message,
wherein the first information on the first network slice system of the first authentication data request message includes first network slice identification information (NSID), and
wherein the first authentication data response message includes a random number (RAND), an authentication key (AUTN), and an expected result (XRES) that are generated by the authentication server, based on the first network slice identification information (NSID) of the first authentication data request message.

2. The communication method of claim 1, further comprising:
sending, by the second network slice system to the authentication server, a second authentication data request message, wherein the second authentication data request message includes second information on the second network slice system;
receiving, by the second network slice system from the authentication server, a second authentication data response message corresponding to the second authentication data request message;
after receiving the second authentication data response message, sending, by the second network slice system to the communication terminal, a second authentication request message generated based on the second authentication data response message; and
receiving, from the communication terminal by the second network slice system, a second authentication response message corresponding to the second authentication request message,
wherein the second network slice system is different from the first network slice system.

3. The communication method of claim 1, wherein the first authentication request message includes the random number (RAND) and the authentication key (AUTN), and
wherein the first authentication response message includes a result (RES) generated by the communication terminal, based on the random number (RAND) and the authentication key (AUTN) of the first authentication request message.

4. The communication method of claim 3, further comprising comparing, by the first network slice system, the result (RES) with the expected result (XRES) to determine whether the communication terminal is authenticated.

* * * * *